(12) United States Patent
Ito et al.

(10) Patent No.: US 7,468,938 B2
(45) Date of Patent: Dec. 23, 2008

(54) RECORDING METHOD, REPRODUCTION METHOD, RECORDING APPARATUS, REPRODUCTION APPARATUS, AND INFORMATION RECORDING MEDIUM

(75) Inventors: Motoshi Ito, Osaka (JP); Hiroshi Ueda, Osaka (JP); Toshiyuki Fukushima, Osaka (JP)

(73) Assignee: Panasonic Corporation, Kadoma (JP)

( * ) Notice: Subject to any disclaimer, the term of this patent is extended or adjusted under 35 U.S.C. 154(b) by 0 days.

(21) Appl. No.: 12/105,425

(22) Filed: Apr. 18, 2008

(65) Prior Publication Data

US 2008/0198715 A1  Aug. 21, 2008

Related U.S. Application Data

(62) Division of application No. 11/338,242, filed on Jan. 24, 2006, now Pat. No. 7,382,705, which is a division of application No. 10/102,575, filed on Mar. 20, 2002, now Pat. No. 7,023,775.

(30) Foreign Application Priority Data

Mar. 22, 2001 (JP) .............................. 2001-082152

(51) Int. Cl.
*G11B 11/00* (2006.01)
(52) U.S. Cl. ................. 369/53.12; 369/30.04; 369/53.2
(58) Field of Classification Search ................. None
See application file for complete search history.

(56) References Cited

U.S. PATENT DOCUMENTS

| | | | |
|---|---|---|---|
| 5,077,720 A | 12/1991 | Takagi et al. | |
| 5,177,720 A | 1/1993 | Kondo | |
| 5,448,728 A | 9/1995 | Takano et al. | |
| 5,519,680 A | 5/1996 | Honda | |
| 5,825,739 A | 10/1998 | Saito et al. | |

(Continued)

FOREIGN PATENT DOCUMENTS

JP  59-213080  12/1984

(Continued)

OTHER PUBLICATIONS

Japanese Office Action for corresponding Application No. 2002-079792 dated Jul. 8, 2008.

(Continued)

*Primary Examiner*—Paul Huber
(74) *Attorney, Agent, or Firm*—Renner, Otto, Boisselle & Sklar, LLP

(57) ABSTRACT

A recording method for recording, on a write once type information recording medium, management information representing a recording state of the write once type information recording medium is provided. The information recording medium includes data including a first synchronization signal. The information recording medium has a second synchronization signal pre-recorded by cutting. The recording method includes the steps of (a) performing a recording operation for recording the management information at a predetermined position of the information recording medium based on the first synchronization signal; (b) determining whether the recording operation in step (a) is normally terminated or not; and (c) when the recording operation in step (a) is not normally terminated, performing a recording operation for recording the management information at the predetermined position of the information recording medium based on the second synchronization signal.

2 Claims, 24 Drawing Sheets

U.S. PATENT DOCUMENTS

| | | |
|---|---|---|
| 5,896,351 A | 4/1999 | Misaizu et al. |
| 6,904,229 B1 | 6/2005 | Suzuki et al. |
| 7,023,775 B2 | 4/2006 | Ito et al. |

FOREIGN PATENT DOCUMENTS

| | | |
|---|---|---|
| JP | 02-239492 | 9/1990 |
| JP | 05-089468 | 4/1993 |
| JP | 07-085608 | 3/1995 |
| JP | 08-227371 | 9/1996 |
| JP | 09-167446 | 6/1997 |
| JP | 2001-043663 | 2/2001 |

OTHER PUBLICATIONS

Japanese Office Action for corresponding Application No. 2008-008383 dated Jul. 8, 2008.

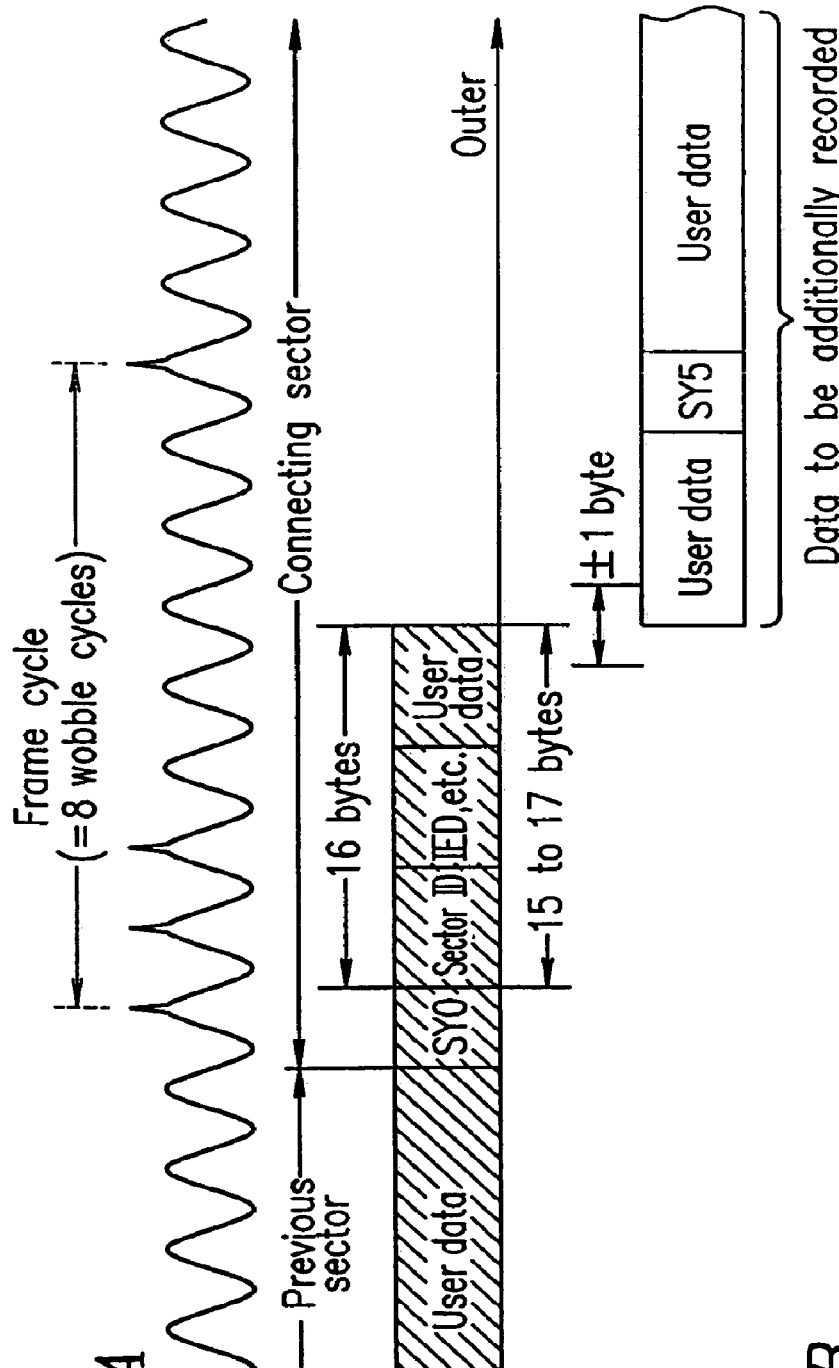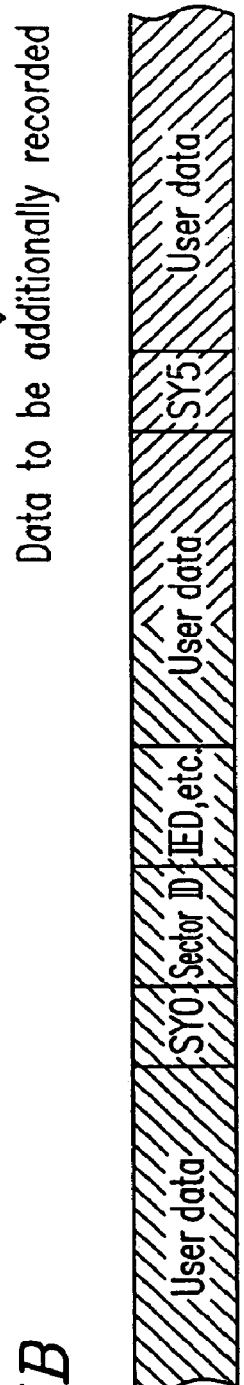
FIG.5A
FIG.5B

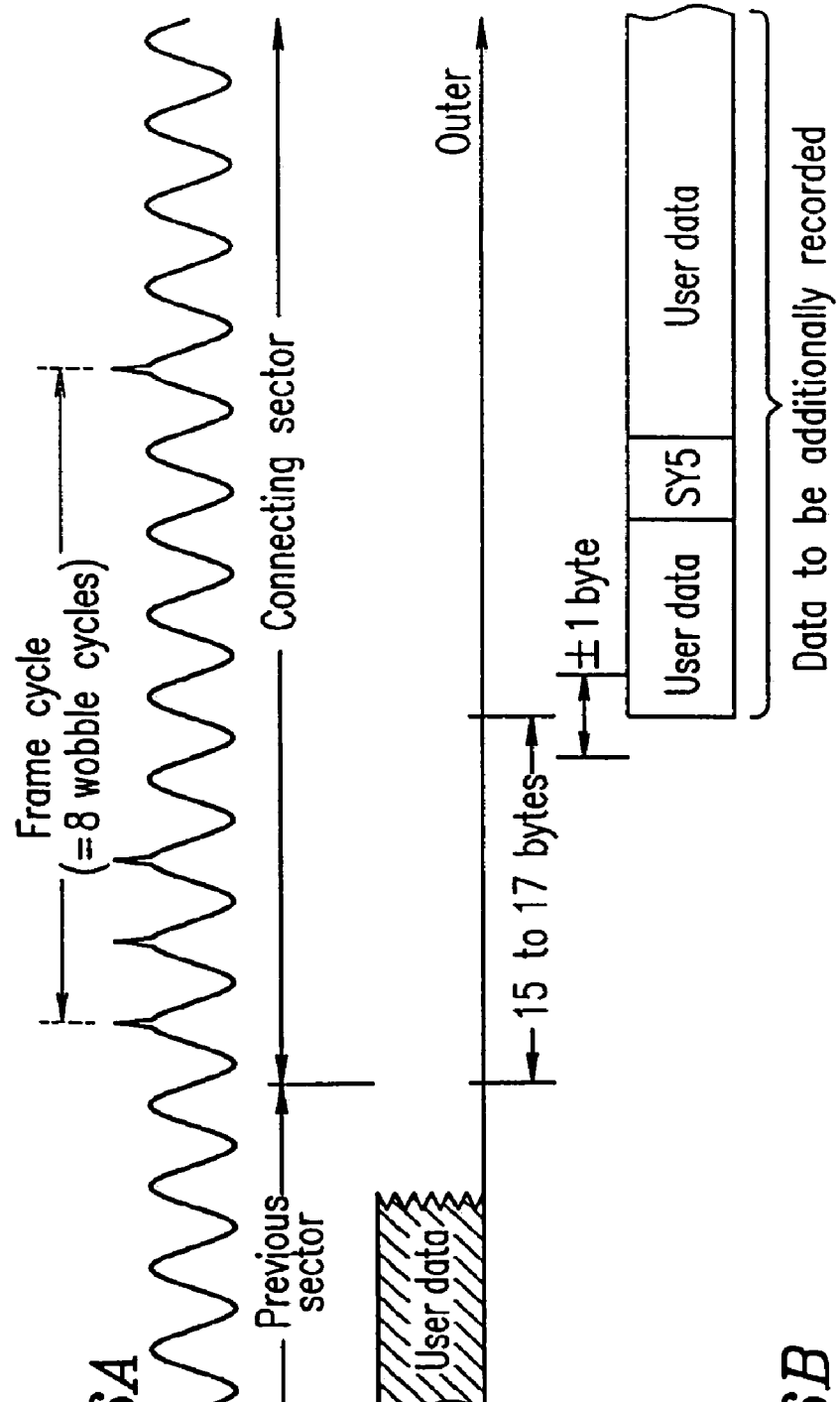
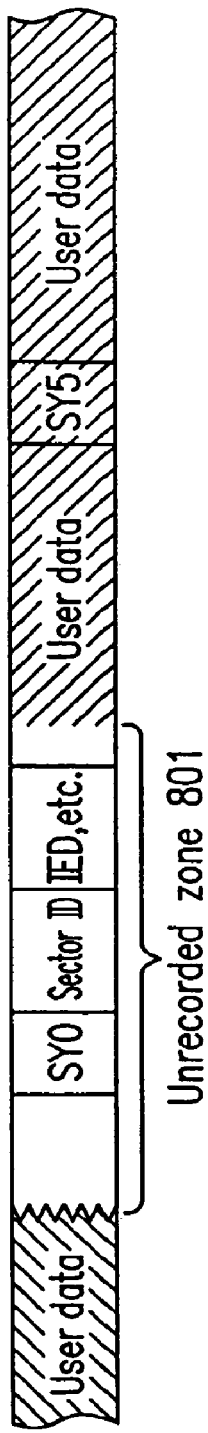
FIG. 6A
FIG. 6B

RECORDING METHOD, REPRODUCTION METHOD, RECORDING APPARATUS, REPRODUCTION APPARATUS, AND INFORMATION RECORDING MEDIUM

This application is a divisional application of U.S. patent application Ser. No. 11/338,242 filed on Jan. 24, 2006 now U.S. Pat. No. 7,382,705, which is a divisional of Ser. No. 10/102,575 filed Mar. 20, 2002 now U.S. Pat. No. 7,023,775 issued on Apr. 4, 2006, the entire disclosures of which are incorporated herein by reference, and is related to sibling, (U.S. application Ser. No. 12/105,471) filed on Apr. 18, 2008.

BACKGROUND OF THE INVENTION

1. Field of the Invention

The present invention relates to a recording method, a reproduction method, a recording apparatus, and a reproduction apparatus for recording data to or reproducing data from a write once type information recording medium, and a recording medium. More specifically, the present invention relates to a recording method, a reproduction method, a recording apparatus, and a reproduction apparatus for recording or reproducing management information which represents a recording state of a recording medium, and a recording medium having management information recorded thereon.

2. Description of the Related Art

Recently, information recording media represented by hard discs and optical discs have been increased in their recording density and capacity. As the recording density and the recording capacity increase, it becomes more important to guarantee the reliability of the discs.

As write once type optical discs, CD-R discs have been remarkably widespread. CD-R discs are well known for of their low prices and wide usability of being reproduceable by most CD players, and are widely used for creating original user CDs.

DVDs, too, are becoming being widespread in the U.S. and Japan. DVDs are widely used for recording high quality moving pictures due to their feature of a large capacity.

DVD-R discs, which are write once type optical discs in conformity to the DVD standards, are expected to be widespread in the future.

FIG. 1 schematically shows a recording face of a DVD-R disc. The recording face has a substantially continuous groove 101 formed therein. The groove 101 is wobbled at a certain cycle, and is cut at predetermined positions. The cycle of wobbles is referred to as a "wobble cycle", and the positions at which the groove 101 is cut is referred to as an "LPP (land pre-pit)".

Data is recorded on a DVD-R disc by emitting laser light in a pulse like manner while the laser light is caused to track a land 102 interposed between two adjacent grooves 101 so as to form pits (not shown) on the land 102.

FIG. 2 shows a waveform of a tracking error signal obtained by light reflected by the DVD-R disc. The waveform of the tracking error signal is obtained by adding pulses at the LPPs to the sine wave having a wobble cycle. The wobble and the LPP can both be used as a synchronous signal pre-recorded by cutting on the DVD-R disc.

By using the pre-recorded synchronous signals, the laser light can be positioned even on a new DVD-R disc having no pits formed on the land. On the DVD-R disc, data is recorded in the form of pits. The data is recorded in synchronization with the synchronous signals pre-recorded on the DVD-R disc (i.e., in positional alignment with the wobbles and LPPs). Herein, such synchronization will be referred to as "pre-pit synchronization".

FIG. 3 shows the relationship between information on cutting of a DVD-R disc and information to be recorded. A waveform 301 represents a tracking error signal, which has a wobble cycle. As shown in FIG. 3, 8 wobble cycles equals to one frame cycle. An LPP is positioned at each of the leading three wobble cycles of each frame cycle.

3-bit information can be represented for each frame cycle based on whether the LPP exists or not. The 3-bit information is referred to as "pre-pit information". Regarding the meaning represented by the pre-pit information, modulation rules are defined as follows, for example. In the case where the presence of an LPP is represented by "1b" and the absence of an LPP is represented by "0b", "111b" represents a break in the pre-pit information, "100b" represents information 0, and "101b" represents information 1. The pre-pit information includes, for example, information on positions on the disc.

Data to be recorded on the DVD-R disc starts with the leading frame of pre-pit information. 26 frames form one sector, and 16 sectors form one ECC block. One sector includes 2048 byte user data, a synchronization mark (for example, SY0, SY1 and SY5 in FIG. 3), a sector ID used for identifying each sector, an IED as an error correction code for the sector ID, and an ECC as an error correction code for the user data.

Each sector includes an error correction code which has been calculated in units of ECC blocks. Accordingly, recording to and reproduction from a DVD-R disc need to be performed in units of ECC blocks.

A write once type recording medium does not allow information once recorded from being erased. Due to this feature, new information is additionally recorded at other portions of the DVD-R disc instead of overwriting information once recorded. Therefore, a write once type recording medium has different management information from that of a rewritable recording medium. In a CD-R disc, data is managed in units of tracks and sessions. A track corresponds to, for example, a tune in the case of a music CD. A collection of tracks reproduceable by a player is referred to as a session. Similarly in the case of a DVD-R disc, there are concepts of RZone and border. RZone corresponds to the track, and border corresponds to the session.

FIG. 4 schematically shows additional recording of information on a DVD-R disc. A recording area of a DVD-R disc is divided into an R information area 401 (R-info.), a lead-in area 402 (Lead-In), a data area 403 (Data Area), and a lead-out area 404 (Lead-Out) which are located from the innermost part to the outermost part of the DVD-R disc.

R-info. is specific to the DVD-R disc and includes a power calibration area (PCA) 411 and a recording management area (RMA) 412.

In the data area 403, user data is recorded. The lead-in area 402 and the lead-out area 404 are buffer areas provided in preparation of overruns of the recording/reproduction head when the recording/reproduction head accesses the data area 403. A border-in area and a border-out area described below also act as a buffer area. In the lead-in area 402, an area bordering the data area 403 is referred to as an "extra-border zone" 421. The extra-border zone plays substantially the same role as that of the border-in area.

In the data area 403, an area which is not explicitly reserved is referred to as an invisible RZone. In a new DVD-R disc, the entire data area 403 is an invisible RZone.

When an area for storing a content to be recorded (for example, one music tune, one drama of video, or one file of computer data) is reserved, an RZone is formed at the start of the invisible RZone. Data of the content can be recorded sequentially from the start of the RZone. When the size of the content is not known, the data of the content can be recorded sequentially from the start of the invisible RZone.

In order to place a DVD-R disc having contents recorded thereon into a state reproduceable by a DVD player, an area to be reproduced and buffer areas interposing the area to be reproduced need to be recognizable as recorded areas. The reason is because DVD players generally cannot read the information on cutting on DVD-R discs and reproduce recorded data using only the pit information recorded in the land as a clue. For the purpose of making the area to be reproduced and the buffer areas identifiable as recorded areas, when the reserved RZone still includes an unrecorded area, such an unrecorded area is filled with 0 padding data so that the unrecorded area is recognizable as a recorded area (this procedure is referred to as a "closing of RZone"). In addition, predetermined data is recorded in the extra-border zone (or the border-in area) and the border-out area interposing the unrecorded area (this procedure is referred to as a "closing of border").

An area in contact with and radially farther than the border-out area is kept empty as a border-in area for the user data to be recorded next. Accordingly, the invisible RZone starts with an area in contact with and radially farther than the empty border-in area. The border-out area and the border-in area adjacent to each other are collectively referred to as a "border zone".

For further recording additional content on the DVD-R disc, the data of the content is recorded from the start of the invisible RZone. When all the contents are recorded on the DVD-R disc, the lead-out area is made recognizable identifiable as a recorded area in addition to performing the closing of border (this procedure is referred to as "finalization"). Once a DVD-R disc is finalized, no more data can be added to the DVD-R disc.

The recording management area (RMA) 412 manages a change in the recording state in the lead-in area and the lead-out area. The RMA 412 includes an RMA lead-in area representing the start of the RMA 412 and recording management data (RMD). The RMA 412 is immediately preceded by a linking loss area (LLA), which acts as a runway used for establishing PLL synchronization or frame synchronization required for data reproduction.

In a DVD-R disc, error correction codes are calculated in units of ECC blocks. Therefore, the size of each RMD is an ECC block. At, for example, the time immediately before the DVD-R disc is discharged from a recording apparatus, the position of each border zone and the position of each RZone at that point, for example, are recorded as RMD on the DVD-R disc. When the recording management area (RMA) 412 is updated for the first time, predetermined data is recorded in the LLA, RMA lead-in area, and an RMD #1 area. When the recording management area (RMA) 412 is updated the next time, predetermined data is recorded in an RMD #2 area.

Thus, RMD represents the recording state of the DVD-R disc at each point during recording of user data in the data area 403.

The RMD #1 area, the RMD #2 area, . . . RMD #700 area are included in the RMA 421. The RMD #1 area through the RMD #700 area are a plurality of blocks, each of which is used for recording management information. In the following description, The RMD #1 area, the RMD #2 area, . . . the RMD #700 area will sometimes be simply referred to as "RMD#1, RMD #2, . . . RMD #700". "RMD" represents data (management information) recorded in these blocks. The management information is sequentially recorded from the start of a leading portion of the RMA 421. Therefore, among the blocks having data recorded therein which are included in the RMA 421, the latest information is recorded in the rearmost block having data recorded therein.

FIGS. 5A and 5B show a linking operation of additionally recording data after a recorded area. In FIG. 5A, recorded data is represented by hatching, and data to be additionally recorded is not provided with hatching. For stopping the recording of old data (hatched in FIG. 5A), the recording is stopped after recording 16-byte data including the synchronization mark SY0 and the sector ID in a sector (referred to as a "connecting sector") following the final sector in the final ECC block. Recording of new data (non-hatched in FIG. 5A) is started with recording the 17the byte data at the position of 16 bytes±1 byte counted from the synchronization mark of the connecting sector.

FIG. 5B shows the state of the connection sector after the linking operation. Additionally recorded data is coupled to the old data in the leading frame of the connecting sector with a shift within ±1 byte. A shift of even one bit causes erroneous demodulation of data from the connecting position to the next synchronization mark (SY5). However, such erroneously demodulated data is finally recovered by error correction.

The RMD recorded in the RMA is, as described above, important management information representing the recording state of the DVD-R disc. Unless the latest RMD can be recorded in the RMA correctly (namely, recorded in a state in which the RMD is reproduceable with certainty), no more data can be additionally recorded to the DVD-R disc. When this occurs, the characteristic large capacity of the DVD-R disc cannot be utilized. As the memory capacity of the disc is larger, the loss is larger.

For example, when the quality of wobble signals of data is poor and thus the locked state of the wobble PLL is unstable, the positions of the wobbles and LPPs pre-formed in the DVD-R disc may be undesirably shifted significantly from the position of the RMD recorded on the DVD-R disc. In such a case, the RMD which is recorded after that data in positional alignment with the wobbles and LPPs may become unreadable.

SUMMARY OF THE INVENTION

According to one aspect of the invention, a recording method for recording, on a write once type information recording medium, management information representing a recording state of the write once type information recording medium is provided. The information recording medium includes data including a first synchronization signal. The information recording medium has a second synchronization signal pre-recorded by cutting. The recording method includes the steps of (a) performing a recording operation for recording the management information at a predetermined position of the information recording medium based on the first synchronization signal; (b) determining whether the recording operation in step (a) is normally terminated or not; and (c) when the recording operation in step (a) is not normally terminated, performing a recording operation for recording the management information at the predetermined position of the information recording medium based on the second synchronization signal.

In one embodiment of the invention, the recording method further includes the steps of (d) determining whether the recording operation in step (c) is normally terminated or not; and (e) when the recording operation in step (c) is not normally terminated, performing a recording operation for recording the management information at a position different from the predetermined position of the information recording medium based on the second synchronization signal.

In one embodiment of the invention, the recording method further includes the steps of (f) determining whether the recording operation in step (e) is normally terminated or not; and (g) repeating steps (e) and (f) for the position different from the predetermined position of the information recording medium until the recording operation in step (e) is normally terminated or until a number of times by which the recording operation in step (e) is repeated reaches a predetermined value.

According to another aspect of the invention, a recording method for recording, on a write once type information recording medium, management information representing a recording state of the write once type information recording medium is provided. The recording method includes the steps of (a) performing a recording operation for recording the management information at a predetermined position of the information recording medium; (b) determining whether the recording operation in step (a) is normally terminated or not; and (c) when the recording operation in step (a) is not normally terminated, performing a recording operation for recording the management information at a position different from the predetermined position of the information recording medium.

In one embodiment of the invention, the predetermined position of the information recording medium is left unrecorded.

In one embodiment of the invention, the predetermined position of the information recording medium is left unrecorded.

In one embodiment of the invention, the recording method further includes the steps of (d) determining whether the recording operation in step (c) is normally terminated or not; and (e) repeating steps (c) and (d) for the position different from the predetermined position of the information recording medium until the recording operation in step (c) is normally terminated or until a number of times by which the recording operation in step (c) is repeated reaches a predetermined value.

According to still another aspect of the invention, a recording method for recording, on a write once type information recording medium, management information representing a recording state of the write once type information recording medium is provided. The information recording medium includes a management information area. The management information area includes a plurality of continuous blocks, each of which is usable for recording the management information. The recording method includes the steps of (a) performing a recording operation for recording the management information in a predetermined one of the plurality of blocks; (b) determining whether the recording operation in step (a) is normally terminated or not; and (c) when the recording operation in step (a) is not normally terminated, performing a recording operation for recording the same management information in each of at least two continuous blocks among the plurality of blocks.

In one embodiment of the invention, the step (c) is performed without interrupting the recording operation.

In one embodiment of the invention, the recording method further includes the step of (d) performing reproduction verification of the final management information recorded in the at least two continuous blocks.

According to still another aspect of the invention, a reproduction method for reproducing management information recorded on a write once type information recording medium and representing a recording state of the information recording medium is provided. The information recording medium includes a management information area. The management information area includes a plurality of continuous blocks, each of which is usable for recording the management information. The plurality of blocks each include a predetermined number of sectors. The reproduction method includes the steps of (a) specifying the final block, among the plurality of blocks, in which the management information is recorded; and (b) reproducing the management information recorded in the specified block. The step (a) includes the step of (a1) specifying a recorded block followed by continuous unrecorded sectors of a predetermined number or larger, among the plurality of blocks.

In one embodiment of the invention, the step (a1) includes the steps of (a11) dividing the management information area into units each including the predetermined number of blocks; (a12) finding a boundary between a unit, in which all sectors are unrecorded, and a unit, in which at least one sector is recorded, by binary search; and (a13) determining whether each of all the sectors included in two units adjacent to each other with the boundary therebetween is recorded or not, so as to find the boundary between the unrecorded sectors and the recorded sectors.

According to still another aspect of the invention, a reproduction method for reproducing management information recorded on a write once type information recording medium and representing a recording state of the information recording medium is provided. The information recording medium includes a management information area. The management information area includes a plurality of continuous blocks, each of which is usable for recording the management information. The reproduction method includes the steps of (a) performing a reproduction operation for reproducing the management information recorded in a rearmost block among recorded blocks of the plurality of blocks; (b) determining whether the reproduction operation in step (a) is normally terminated or not; (c) when the reproduction operation in step (a) is not normally terminated, performing a reproduction operation for reproducing the management information recorded in the recorded blocks among the plurality of blocks sequentially from a rearmost block, until the reproduction operation is normally terminated.

According to still another aspect of the invention, a reproduction method for reproducing management information recorded on a write once type information recording medium and representing a recording state of the information recording medium is provided. The information recording medium includes a management information area and a data area. The management information area includes first management information representing a recording state of the information recording medium when user data is recorded in the data area. A plurality of areas distributed in the data area includes second management information representing a recording state of the information recording medium regarding the user data. The reproduction method includes the steps of (a) reproducing the first management information; (b) specifying one of the plurality of areas based on the reproduced first management information; and (c) reproducing the second management information recorded in the plurality of areas sequentially from the specified area toward rearward in the data areas.

In one embodiment of the invention, the reproduction method further includes the steps of (d) determining whether at least the first management information reproduced in step (a) is the latest management information or not. The step (c) is performed in accordance with the result of the determination of step (d).

According to still another aspect of the invention, a recording apparatus for recording, on a write once type information recording medium, management information representing a recording state of the write once type information recording medium is provided. The information recording medium includes data including a first synchronization signal. The information recording medium has a second synchronization signal pre-recorded by cutting. The recording apparatus includes a recording section for performing a recording operation for recording the management information at a predetermined position of the information recording medium based on the first synchronization signal; and a determination section for determining whether the recording operation is normally terminated or not. When the recording operation is not normally terminated, the recording section further performs a recording operation for recording the management information at the predetermined position of the information recording medium based on the second synchronization signal.

In one embodiment of the invention, the determination section further determines whether the recording operation based on the second synchronization signal is normally terminated or not. When the recording operation based on the second synchronization signal is not normally terminated, the recording section further performs a recording operation for recording the management information at a position different from the predetermined position of the information recording medium based on the second synchronization signal.

In one embodiment of the invention, the determination section further determines whether the recording operation at the position different from the predetermined position is normally terminated or not. The recording section repeats the recording operation at the position different from the predetermined position, until the recording operation is determined to be normally terminated or until a number of times by which the recording operation is repeated reaches a predetermined value.

According to still another aspect of the invention, a recording apparatus for recording, on a write once type information recording medium, management information representing a recording state of the write once type information recording medium is provided. The recording apparatus includes a recording section for performing a recording operation for recording the management information at a predetermined position of the information recording medium; and a determination section for determining whether the recording operation is normally terminated or not. When the recording operation is not normally terminated, the recording section further performs a recording operation for recording the management information at a position different from the predetermined position of the information recording medium.

In one embodiment of the invention, the recording section leaves the predetermined position of the information recording medium unrecorded.

In one embodiment of the invention, the recording section leaves the predetermined position of the information recording medium unrecorded.

In one embodiment of the invention, the determination section determines whether the recording operation at the position different from the predetermined position is normally terminated or not. The recording section repeats the recording operation at the position different from the predetermined position, until the recording operation is determined to be normally terminated or until a number of times by which the recording operation is repeated reaches a predetermined value.

According to still another aspect of the invention, a recording apparatus for recording, on a write once type information recording medium, management information representing a recording state of the write once type information recording medium is provided. The information recording medium includes a management information area.

The management information area includes a plurality of continuous blocks, each of which is usable for recording the management information. The recording apparatus includes a recording section for performing a recording operation for recording the management information in a predetermined one of the plurality of blocks; and a determination section for determining whether the recording operation is normally terminated or not. When the recording operation is not normally terminated, the recording section further performs a recording operation for recording the same management information in each of at least two continuous blocks among the plurality of blocks.

In one embodiment of the invention, the recording operation in the at least two continuous blocks among the plurality of blocks is performed without interrupting the recording operation.

In one embodiment of the invention, the recording apparatus further includes a verification section for performing reproduction verification of the final management information recorded in the at least two continuous blocks.

According to still another aspect of the invention, a reproduction apparatus for reproducing management information, recorded on a write once type information recording medium and representing a recording state of the information recording medium is provided. The information recording medium includes a management information area. The management information area includes a plurality of continuous blocks, each of which is usable for recording the management information. The plurality of blocks each include a predetermined number of sectors. The reproduction apparatus includes a specification section for specifying the final block, among the plurality of blocks, in which the management information is recorded; and a reproduction section for reproducing the management information recorded in the specified block. The specification section specifies a recorded block followed by continuous unrecorded sectors of a predetermined number or larger, among the plurality of blocks.

In one embodiment of the invention, the specification section divides the management information area into units each including the predetermined number of blocks; finds a boundary between a unit, in which all sectors are unrecorded, and a unit, in which at least one sector is recorded, by binary search; and determines whether each of all the sectors included in two units adjacent to each other with the boundary therebetween is recorded or not, so as to find the boundary between the unrecorded sectors and the recorded sectors.

According to still another aspect of the invention, a reproduction apparatus for reproducing management information, recorded on a write once type information recording medium and representing a recording state of the information recording medium is provided. The information recording medium includes a management information area. The management information area includes a plurality of continuous blocks, each of which is usable for recording the management information. The reproduction apparatus includes a reproduction section for performing a reproduction operation for reproducing the management information recorded in a rearmost block among recorded blocks of the plurality of blocks; and a determination section for determining whether the reproduction operation is normally terminated or not. When the reproduction operation is not normally terminated, the reproduction section further performs a reproduction operation for reproducing the management information recorded in the recorded blocks among the plurality of blocks sequentially from a rearmost block, until the reproduction operation is normally terminated.

According to still another aspect of the invention, a reproduction apparatus for reproducing management information, recorded on a write once type information recording medium and representing a recording state of the information recording medium is provided. The information recording medium includes a management information area and a data area. The management information area includes first management information representing a recording state of the information recording medium when user data is recorded in the data area. A plurality of areas distributed in the data area includes second management information representing a recording state of the information recording medium regarding the user data. The reproduction apparatus includes a reproduction section for reproducing the first management information; and a specification section for specifying one of the plurality of areas based on the reproduced first management information. The reproduction section further reproduces the second management information recorded in the plurality of areas sequentially from the specified area towards rearward the data areas.

In one embodiment of the invention, the reproduction method further includes a determination section for determining whether at least the first management information reproduced is the latest management information or not. The reproduction section reproduces the second management information in accordance with the result obtained by the determination section.

According to still another aspect of the invention, a write once type information recording medium including a management information area is provided. The management information area includes a plurality of continuous blocks, each of which is usable for recording the management information. At least one of the plurality of blocks includes data positioned based on the data recorded in a block immediately forward thereto.

According to still another aspect of the invention, a write once type information recording medium including a management information area is provided. The management information area includes a plurality of continuous blocks, each of which is usable for recording the management information. At least one of the plurality of blocks following an unrecorded block is recorded.

According to still another aspect of the invention, a write once type information recording medium including a management information area is provided. The management information area includes a plurality of continuous blocks, each of which is usable for recording the management information. At least two continuous blocks of the plurality of blocks have the same management information recorded therein.

According to still another aspect of the invention, a recording method for recording predetermined data other than user data on a write once type information recording medium is provided. The information recording medium includes data including a first synchronization signal. The information recording medium has a second synchronization signal prerecorded by cutting. The recording method includes the steps of (a) performing a recording operation for recording the predetermined data at a predetermined position of the information recording medium based on the first synchronization signal; (b) determining whether the recording operation in step (a) is normally terminated or not; and (c) when the recording operation in step (a) is not normally terminated, performing a recording operation for recording the predetermined data at the predetermined position of the information recording medium based on the second synchronization signal.

According to still another aspect of the invention, a recording apparatus for recording predetermined data other than user data on a write once type information recording medium is provided. The information recording medium includes data including a first synchronization signal. The information recording medium has a second synchronization signal pre-recorded by cutting. The recording apparatus includes a recording section for performing a recording operation for recording the predetermined data at a predetermined position of the information recording medium based on the first synchronization signal; and a determination section for determining whether the recording operation is normally terminated or not. When the recording operation is not normally terminated, the recording section further performs a recording operation for recording the predetermined data at the predetermined position of the information recording medium based on the second synchronization signal.

According to still another aspect of the invention, a recording method for recording predetermined data other than user data on a write once type information recording medium is provided. The recording method includes the steps of (a) performing a recording operation for recording the predetermined data at a predetermined position of the information recording medium; (b) determining whether the recording operation in step (a) is normally terminated or not; and (c) when the recording operation in step (a) is not normally terminated, performing a recording operation for recording the predetermined data at a position different from the predetermined position of the information recording medium.

According to still another aspect of the invention, a recording apparatus for recording, on a write once type information recording medium, predetermined data other than user data is provided. The recording apparatus includes a recording section for performing a recording operation for recording the predetermined data at a predetermined position of the information recording medium; and a determination section for determining whether the recording operation is normally terminated or not. When the recording operation is not normally terminated, the recording section further performs a recording operation for recording the predetermined data at a position different from the predetermined position of the information recording medium.

Thus, the invention described herein makes possible the advantages of providing (1) a recording method and a recording apparatus for improving the reliability of recording management data (RMD) recorded in a recording management area of a recording medium; (2) a reproduction method and a reproduction apparatus for reproducing the RMD recorded by the recording method and the recording apparatus; and (3) a recording medium having highly reliable RMD recorded thereon.

These and other advantages of the present invention will become apparent to those skilled in the art upon reading and understanding the following detailed description with reference to the accompanying figures.

BRIEF DESCRIPTION OF THE DRAWINGS

FIGS. 5A and 5B show a linking operation of newly adding information to the recorded information;

FIGS. 6A and 6B illustrate an advantage of pre-pit synchronization;

DESCRIPTION OF THE PREFERRED EMBODIMENTS

Hereinafter, the present invention will be described by way of illustrative examples with reference to the accompanying drawings.

Pre-pit synchronization and data synchronization used in the present invention will be described. As described above, data is usually recorded on a DVD-R disc by pre-pit synchronization. Alternatively, data can be recorded based on a timing signal (synchronization signal), which is extracted from data (pits) already recorded on a DVD-R disc. Such synchronization is referred to as data synchronization.

With reference to FIGS. 6 and 7, advantages and disadvantages of pre-pit synchronization for DVD-R discs will be described.

FIGS. 6A and 6B show advantages of the pre-pit synchronization. FIG. 6A shows a state where previous recording has been performed to a point in a sector (previous sector) and the recording is stopped at that point due to some obstruction. In this case, there is no data already recorded on the DVD-R disc, and therefore recording cannot be started with data synchronization. Furthermore, when data is recorded on a new DVD-R disc (write once type disc), for example, data synchronization is clearly unusable no matter what interpolation method is used. Accordingly, for recording data on a new DVD-R disc, recording is necessarily started by pre-pit synchronization. FIG. 6B shows a state of the sectors after the additional recording. Pre-pit synchronization leaves an unrecorded zone 801 in the DVD-R disc, but allows data to be additionally recorded from the connecting sector.

Figures 7A, 7B:
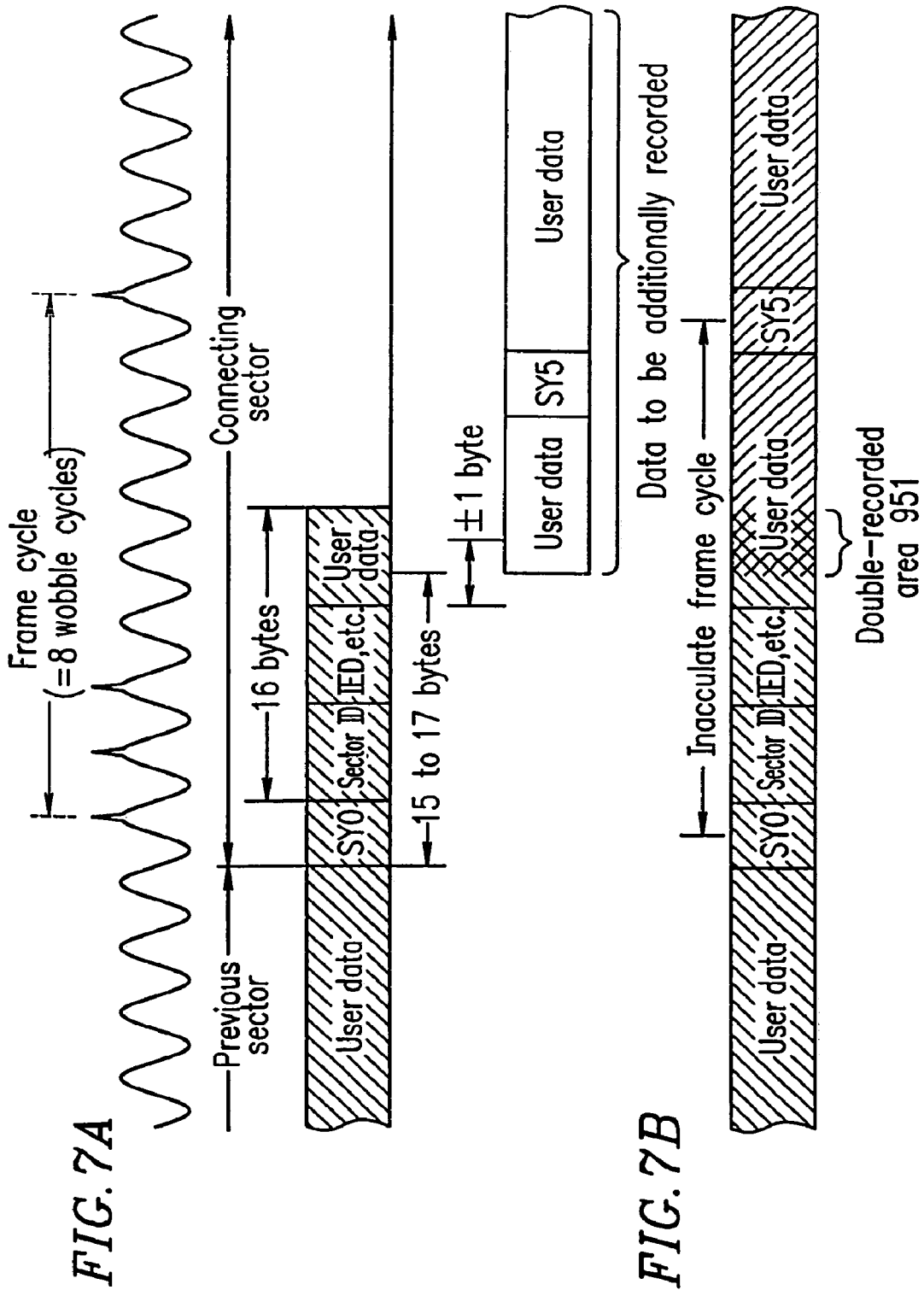
FIGS. 7A and 7B illustrate a disadvantage of pre-pit synchronization.

FIGS. 7A and 7B show disadvantages of the pre-pit synchronization. FIG. 7A shows a state where previously recorded data (hatched in FIG. 7A) is shifted from the wobble cycle for some obstruction. Such a state occurs when, for example, the quality of the wobble signals are poor and thus the locked state of the wobble PLL is unstable.

FIG. 7B shows a state of the sectors obtained after new data is additionally recorded in the above-described state using pre-pit synchronization. In the vicinity of the start of the additional recording, there is a double-recorded area 951. Depending on the direction of shifting of the previously recorded data, there may be an unrecorded area in the vicinity of the start of the additional recording.

The area of the double-recorded area 951 or the unrecorded area has a size exceeding one byte. When the double-recorded area 951 or the unrecorded area is formed, the frame cycle of the recorded data becomes inaccurate. In a sector having the inaccurate frame cycle, the distance between two adjacent frame synchronization marks (SY0 and SY5) is different from the predetermined distance. As a result, the frame synchronization marks SY5 and those thereafter cannot be detected. This disables data reproduction.

Herein, in the case where there are an area A and an area B along an information area of the information recording medium, and data is recorded to or reproduced from area A after area B, area A is expressed as being "rearward" with respect to area B, and area B is expressed as being "forward" with respect to area A. The expression that one area is "rearward" or "forward" with respect to the other area does not necessarily mean that the two areas are adjacent to each other. In the case where area A is rearward with respect to area B and the area A is adjacent to area B, area A is expressed as being immediately following area B.

In a DVD-R disc, "rearward" corresponds to the outer portions of the disc. However, the principle of the present invention is not limited to the case where "rearward" corresponds to "outer". The principle of the present invention similarly functions even in the case where "rearward" corresponds to "inner". The following description will be made regarding the case where "rearward" corresponds to "outer".

EXAMPLE 1

In this example, a recording method and a recording apparatus for recording data to a write once type information recording medium, and a write once type information recording medium according to a first example of the present invention will be described with reference to the drawings.

Figure 8:
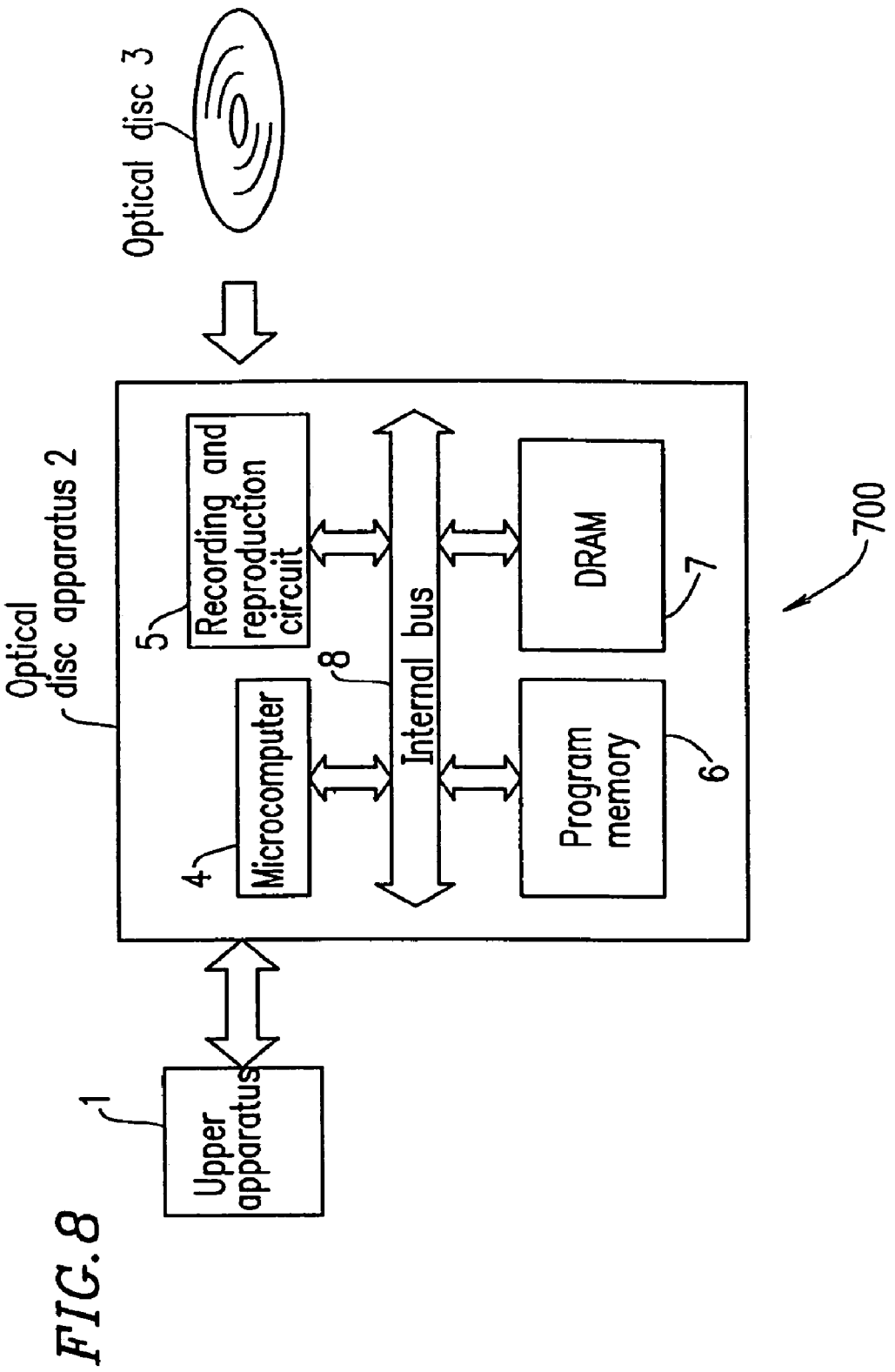
FIG. 8 shows a structure of a system 700 according to a first example of the present invention.

FIG. 8 shows a structure of a system 700 according to the first example of the present invention. The system 700 includes an upper stage apparatus 1, an optical disc apparatus (recording apparatus) 2, and an optical disc 3 (information recording medium). The upper stage apparatus 1 instructs the optical disc apparatus 2 to record data to or reproduce data from the optical disc 3. The upper stage apparatus 1 is, for example, a personal computer.

The upper stage apparatus 1 and the optical disc apparatus 2 may be accommodated in one housing. Such a form is adopted in, for example, optical disc players or optical disc recorders. The optical disc 3 is mounted on the optical disc apparatus 2.

The optical disc apparatus 2 includes a microcomputer 4 for controlling the entirety of the optical disc apparatus 3, a recording and reproduction circuit 5 for accessing the optical disc 3 for data recording or reproduction, a program memory 6 having a control program of the microcomputer 4 stored therein, a DRAM 7 for temporarily holding data to be recorded to or reproduced from the optical disc 3, and an internal bus 8 connecting these elements.

The recording and reproduction circuit 5 acts as a recording section for recording management information to the optical disc 3 (information recording medium).

Figure 9:
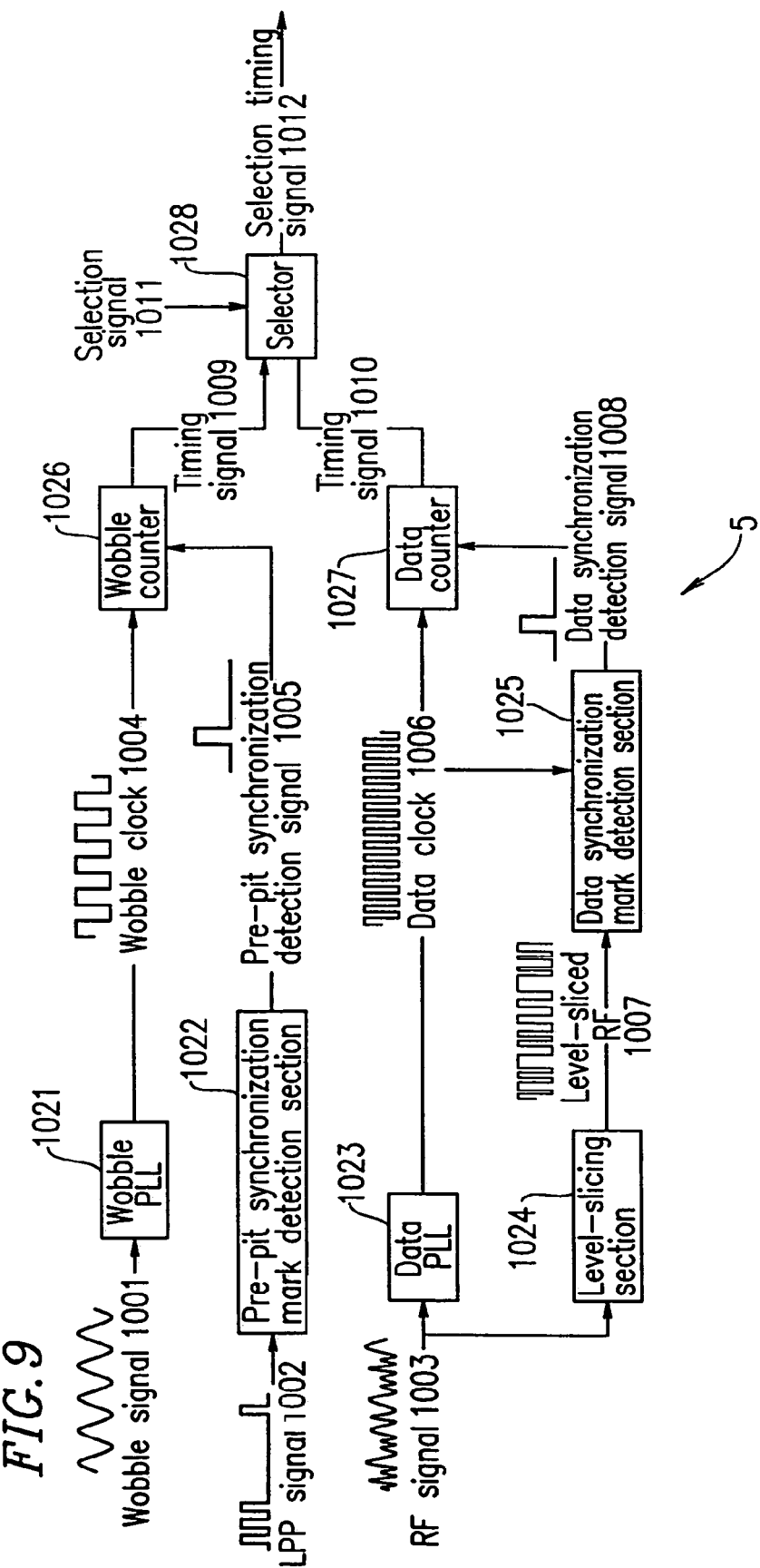
FIG. 9 is a block diagram illustrating a timing of operations of a recording and reproduction circuit 5 of an optical disc apparatus 2.

FIG. 9 is a block diagram illustrating a timing of operations of the recording and reproduction circuit 5.

A wobble signal 1001 extracted from a tracking error signal is input to a wobble PLL 1021. The wobble PLL 1021 extracts a frequency of the wobble signal 1001, and outputs a wobble clock 1004. An LPP signal 1002 extracted from the tracking error signal is input to a pre-pit synchronization mark detection section 1022. When detecting a synchronization mark from the input LPP signal 1002 of the tracking error signal, the pre-pit synchronization mark detection section 1022 outputs a pre-pit synchronization detection signal 1005. A wobble counter 1026 increments a counter value by 1 in response to the wobble clock 1004, and resets the counter value in response to the pre-pit synchronization detection signal 1005. When the counter value becomes a predetermined value, the wobble counter 1026 outputs a timing signal 1009.

An RF signal 1003, which represents the total light amount reflected by the optical disc 3, is input to a data PLL 1023 and a level-slicing section 1024. The data PLL 1023 extracts a frequency of the RF signal 1003, and outputs a data clock 1006. The level-slicing section 1024 slices the amplitude of the RF signal 1003, and outputs a level-sliced RF 1007. A data synchronization mark detection section 1025 samples the level-sliced RF 1007 with the data clock 1006. When detecting a synchronization mark from the level-sliced RF 1007, the data synchronization mark detection section 1025 outputs a data synchronization detection signal 1008. A data counter 1027 increments a counter value by 1 in response to the data clock 1006, and resets the counter value in response to the data synchronization detection signal 1008. When the counter value becomes a predetermined value, the data counter 1027 outputs a timing signal 1010.

A selection signal 1011 set by the microcomputer 4 is input to a selector 1028. The selector 1028 outputs either the timing signal 1009 or 1010 as a selected timing signal 1012 in accordance with the selection signal 1011.

The synchronization method of using the timing signal 1009 (second synchronization signal) obtained from the information (wobbles and LPPs) pre-formed in the optical disc 3 (FIG. 8) corresponds to pre-pit synchronization. The synchronization method of using the timing signal 1010 (first synchronization signal) obtained from the information (data) recorded on the optical disc 3 corresponds to data synchronization. Thus, the data recorded on the optical disc 3 (information recording medium) includes the first synchronization signal, and the optical disc 3 has the second synchronization signal pre-formed by cutting.

In the optical disc apparatus 2 (FIG. 8) in the first example, synchronization condition for additional recording (pre-pit synchronization or data synchronization) is dynamically switched in accordance with the state of the selector previously recorded. This switching operation is performed by the selection signal 1011 generated by the microcomputer 4. Specifically, when the area immediately forward to the position at which additional data recording is to be started is already recorded (i.e., when data is already recorded in such an area), additional recording is performed by data synchronization. When the area immediately forward to the position at which additional data recording is to be started is unrecorded or when additional recording by data synchronization has already ended in a failure, additional recording is performed by pre-pit synchronization. When neither method is usable, the area is skipped and additional recording is performed in another area. Thus, the optical disc apparatus 2 can perform additional recording by pre-pit synchronization, by data synchronization or neither of these two methods is usable. However, the number of areas to be skipped continuously has an upper limit. The provision of the upper limit allows the optical disc apparatus 2 to search for an end of the recording of the optical disc 3, which will be described in detail in a third example of the present invention.

The situation where recording cannot be performed by pre-pit synchronization or data synchronization can occur when, for example, a sector immediately forward to the position at which additional recording is to be started is stained or scratched. When the light spot passes the sector, the tracking servo may be out of control. As a result, data cannot be performed in the sector, or data recorded in the sector cannot be reproduced.

Figure 10:
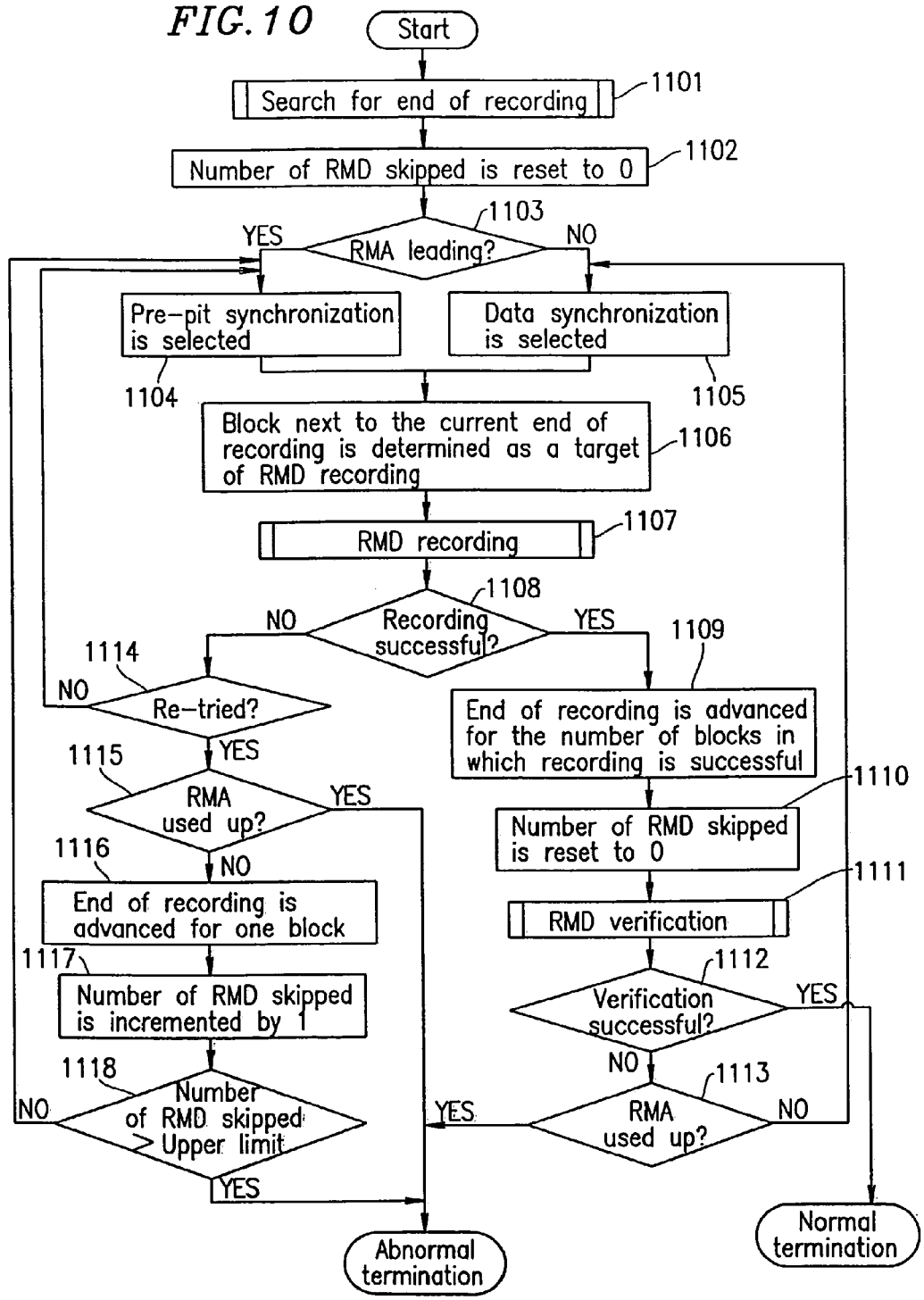
FIG. 10 is a flowchart illustrating RMA updating performed by the optical disc apparatus 2 in the first example.

FIG. 10 is a flowchart illustrating processing of recording data in the RMA performed by the optical disc apparatus 2 (FIG. 8) in the first example. In FIG. 10, processing for an LLA (FIG. 4) and processing for an RMA lead-in area (FIG. 4) are eliminated for the sake of simplicity. Hereinafter, each step of processing of recording data in the RMA will be described.

Step 1101: An end of the recording of the optical disc 3 is searched for. The search processing for an end of the recording will be described in detail in the third example. The end of the recording means a boundary between a recorded block and an unrecorded block.

Step 1102: The number of RMDs skipped is initialized. When the number of RMDs skipped is 0, this means that the number of blocks skipped for recording RMD is 0.

Step 1103: It is determined whether the end of the recording found in the search performed in step 1101 is the leading end of the RMA or not. When the end of the recording is the leading end of the RMA, this means that RMD is not recorded in the RMA. When "yes" in step 1103, the processing goes to step 1104. When "no" in step 1103, the processing goes to step 1105.

Step 1104: Pre-pit synchronization is selected. This is performed by the microcomputer 4 (FIG. 8) generating the selection signal 1011 (FIG. 9) which instructs the selector 1028 (FIG. 9) to select the timing signal 1009.

Step 1105: Data synchronization is selected. This is performed by the microcomputer 4 generating the selection signal 1011 which instructs the selector 1028 to select the timing signal 1010.

Step 1106: A block next to the current end of the recording is determined as a target to which new RMD is to be recorded.

Step 1107: Using the synchronization method selected in step 1104 or 1105, RMD is recorded in the target determined in step 1106.

Step 1108: It is determined whether the RMD is successfully recorded or not (whether the recording operation of the RMD was completed normally or not). The case where the recording operation of the RMD was not completed normally includes the case where, for example, the recording operation of the RMD cannot be started (for example, the position at which the recording is to be started cannot be determined).

The case where the recording operation of the RMD was not completed normally also includes the case where, for example, the recording operation of the RMD started but was interrupted for some reason (for example, an error of the servo system of the recording head, the wobble PLL getting out of synchronization, etc.).

The determination in step 1108 is performed by the microcomputer 4 (FIG. 8). In step 1108, the microcomputer 8 acts as a determination section for determining whether the recording operation was completed normally or not.

When "yes" in step 1108, the processing goes to step 1109. When "no" in step 1108, the processing goes to step 1114.

Step 1109: The position of the end of the recording is advanced by the number of blocks in which the RMD was successfully recorded.

Step 1110: The number of RMDs skipped is reset to 0.

Step 1111: The blocks in which the RMD was recorded is verified (reproduction verification).

Step 1112: It is determined whether the result of the verification is normal or not (whether the recorded RMD is correctly reproduced or not). When "yes" in step 1112, the processing is terminated (normal termination). When "no" in step 1112, the processing goes to step 1113.

Step 1113: It is determined whether the RMA has been used up or not. When "yes" in step 1113, the processing is terminated (abnormal termination). When "no" in step 1113, the processing goes back to step 1105, where data synchronization is selected, and recording of the RMD is re-tried.

Step 1114: It is determined whether recording of the RMD has been re-tried or not. When recording of the RMD has been re-tried, this means that the recording operation of the RMD which ended in a failure (which was not completed normally) in step 1108 was not the first recording operation. When "yes" in step 1114, the processing goes to step 1115. When "no" in step 1114, the processing goes back to step 1104, where pre-pit synchronization is selected, and recording of the RMD is re-tried for the same block.

Step 1115: It is determined whether the RMA has been used up or not. When "yes" in step 1115, the processing is terminated (abnormal termination). When "no" in step 1115, the processing goes to step 1116.

Step 1116: The end of the recording is advanced for one block, thereby skipping the block for which the recording operation of the RMD ended in a failure in step 1108.

Step 1117: The number of RMDs skipped is incremented by 1.

Step 1118: It is determined whether the number of RMDs skipped is larger than the upper limit or not. The number of RMDs skipped represents the size of the continuous area (number of continuous blocks) left unrecorded. When "yes" in step 1118, the processing is terminated (abnormal termination). This means that recording of the RMD ended in a failure. When "no" in step 1118, the processing goes back to step 1104, where pre-pit synchronization is selected, and recording of the RMD is re-tried.

Figure 11:
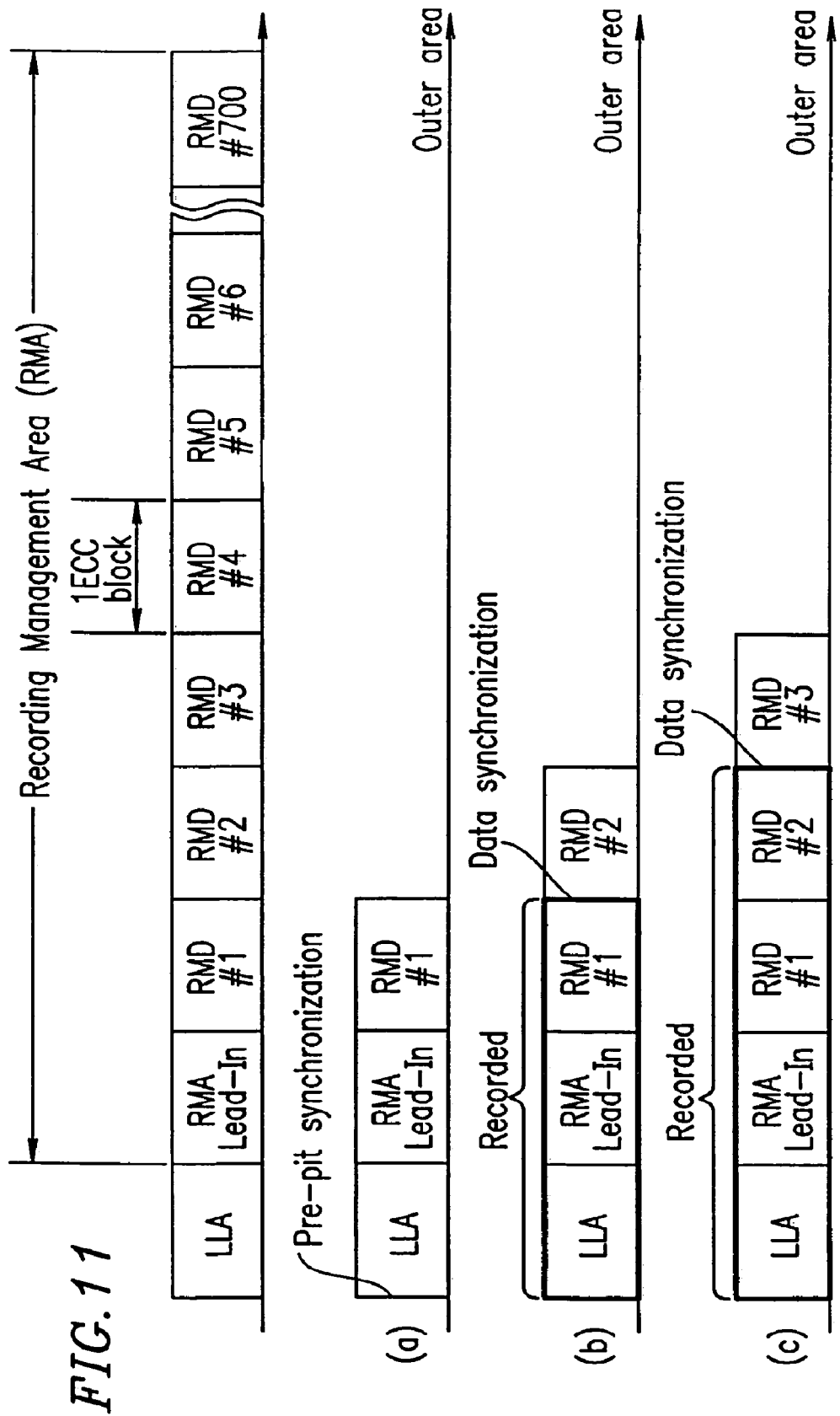
FIG. 11 shows an example of updating the RMA when the recording operations of the RMD continuously succeed.
Figure 12:
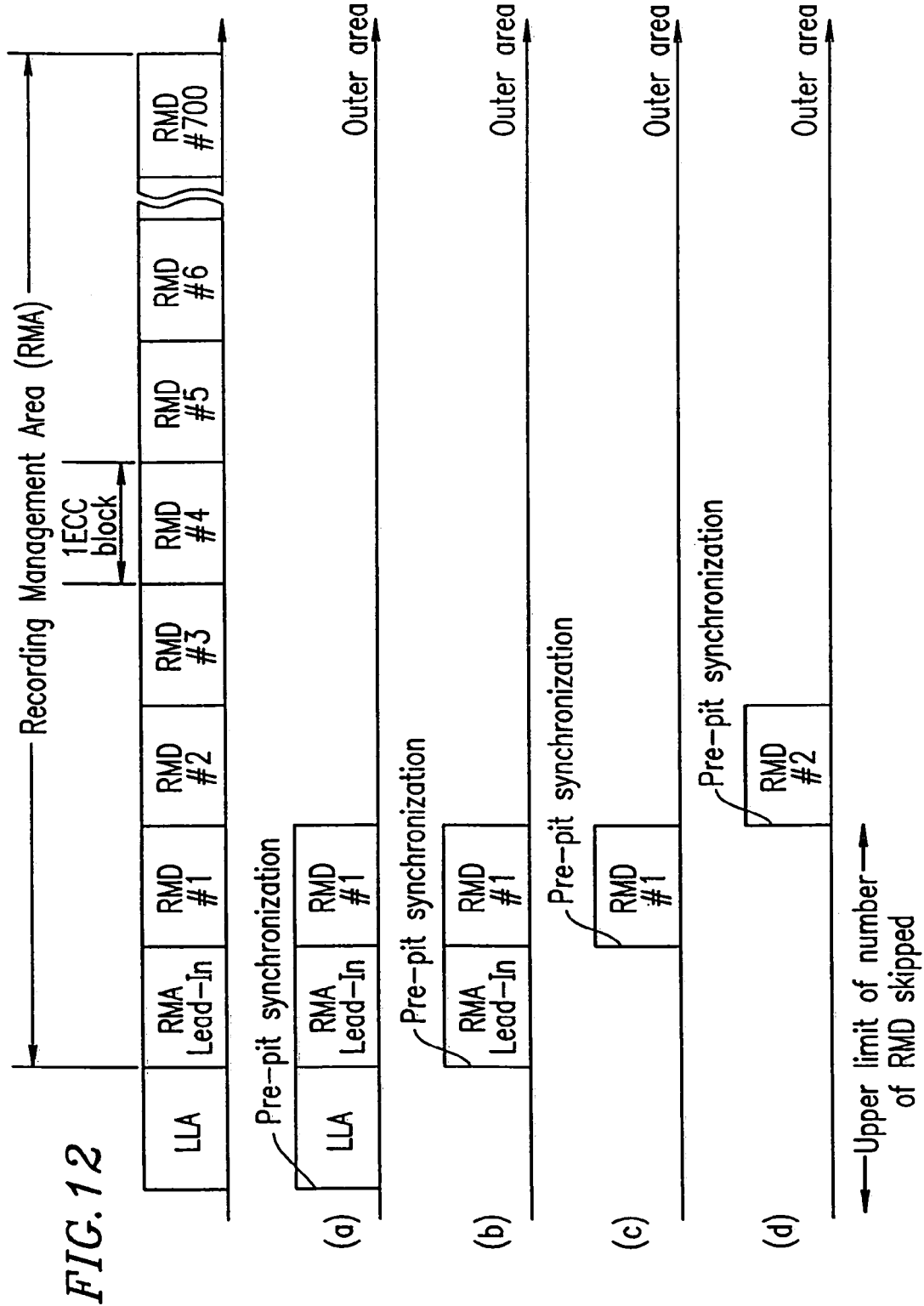
FIG. 12 shows an example of updating the RMA when the recording operation of the RMD ended in a failure in the vicinity of the leading end of the RMA.
Figure 13:
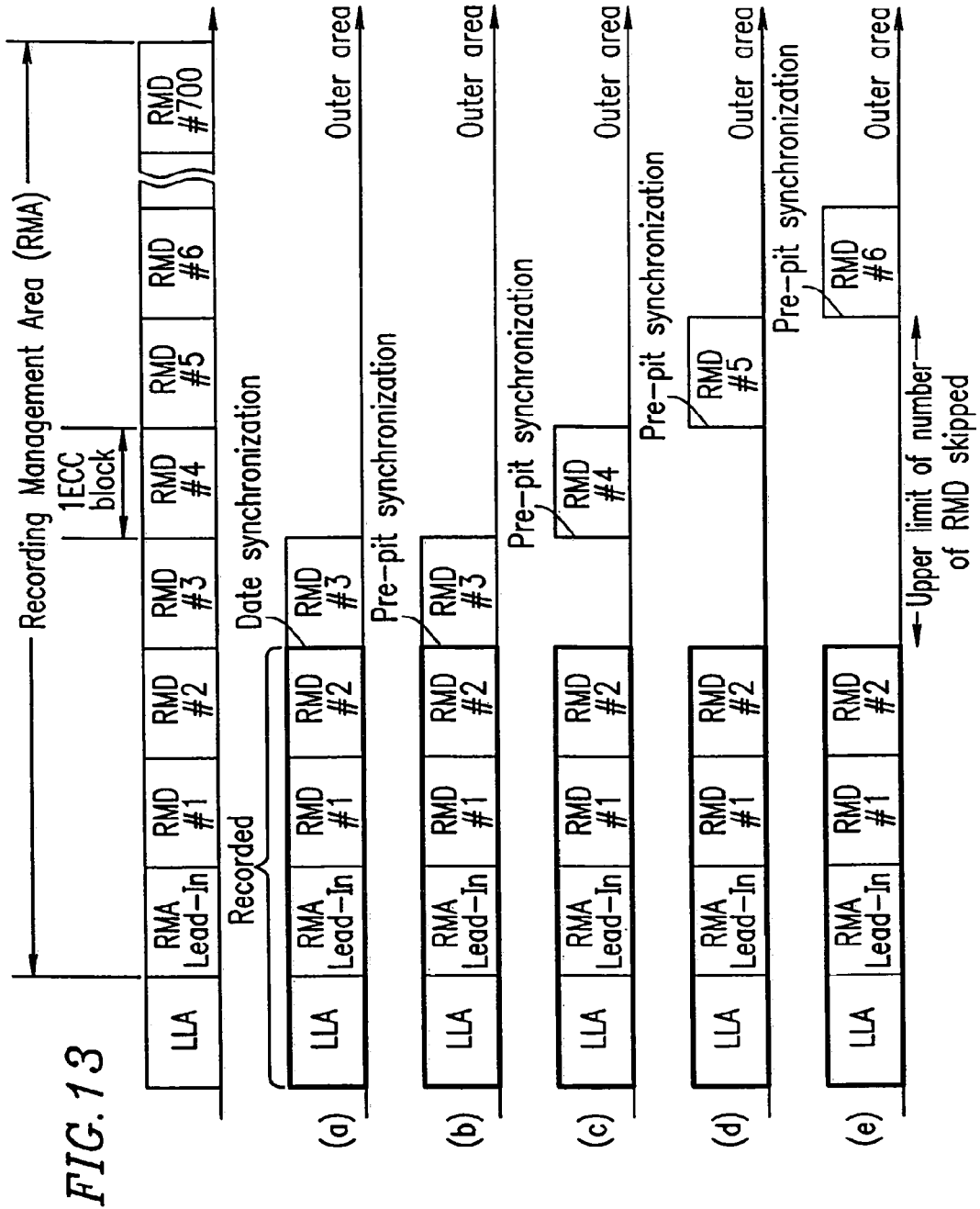
FIG. 13 shows an example of updating the RMA when the recording operation of the RMD ended in a failure in the middle of the RMA.

FIGS. 11, 12 and 13 show specific examples of recording data in the RMA in accordance with the flowchart in FIG. 10. In FIGS. 11, 12 and 13, areas surrounded by bold lines represent recorded blocks.

FIG. 11 shows an example of updating the RMA when the recording operations of the RMD continuously succeed. The updating of the RMA means additionally recording new RMD to the RMA.

State (a) is before RMD is recorded in the RMA for the first time. In state (a), the recording operation is to be performed by pre-pit synchronization in 3 ECC blocks of the LLA, the RMA lead-in area, and RMD#1.

State (b) shows a re-try after verification (step 1111 of FIG. 10) of RMD#1 ended in a failure or a first try (recording operation) after RMD#1 is determined to be recorded in the search for the end of the recording (i.e., when, in step 1101 of FIG. 10, the end of the recording is determined to be between RMD#1 and RMD#2). In state (b), the recording operation is to be performed by data synchronization in 1 ECC block of RMD#2.

State (c) shows a re-try after verification of RMD#2 ended in a failure or a first try after RMD#2 is determined to be recorded in the search for the end of the recording.

In state (c), the recording operation is to be performed by data synchronization in 1 ECC block of RMD#3.

FIG. 12 shows an example of updating the RMA when the recording operation of the RMD ended in a failure in the vicinity of the leading end of the RMA.

State (a) is before RMD is recorded in the RMA for the first time. In state (a), the recording operation is to be performed by pre-pit synchronization in 3 ECC blocks of the LLA, the RMA lead-in area, and RMD#1.

State (b) shows the operation when the RMD cannot be recorded in the LLA by pre-pit synchronization. The LLA is skipped, and the recording operation is to be performed by pre-pit synchronization in 2 ECC blocks of the RMA lead-in area and RMD#1.

State (c) shows the operation when the RMD also cannot be recorded in the RMA lead-in area by pre-pit synchronization. The RMA lead-in area is skipped, and the recording operation is to be performed by pre-pit synchronization in 1 ECC block of RMD#1.

State (d) shows the operation when the RMD also cannot be recorded in RMD#1 by pre-pit synchronization. RMD#1 is skipped, and the recording operation is to be performed by pre-pit synchronization in 1 ECC block of RMD#2. Assuming that the upper limit of the number of areas to be skipped continuously is 3, if the RMD cannot be recorded in RMD#2, the updating of RMA ends in a failure ("yes" in step 1118 of FIG. 10) and the processing is abnormally terminated. In actuality, there is substantially no disc in which the recording operation ends in a failure in all of these methods. Therefore, the updating of the RMA is normally terminated in either one of states (b) through (d).

As described above, in state (c), the recording and reproduction circuit 5 (recording section) performs a recording operation in a predetermined position RMD#1 of the optical disc 3. When the microcomputer 4 (determination section) determines that the recording operation was not normally terminated, the recording and reproduction circuit 5 performs a recording operation in a position RMD#2 which is different from the predetermined position RMD#1 in state (d).

In states (c) and (d), the recording and reproduction circuit 5 records the management information in different positions of the optical disc 3 until the recording operation is terminated normally, or until the number of recording operations reaches a predetermined number.

FIG. 13 shows an example of updating the RMA when the recording operation of the RMD ended in a failure in the middle of the RMA.

In State (a), the RMD is already normally recorded to RMD#2. The recording operation of content representing the latest recording state is to be performed by data synchronization in 1 ECC block of RMD#3.

State (b) shows the operation when the RMD cannot be recorded in RMD#3 by data synchronization ("no" in step 1108 of FIG. 10). The recording operation is to be performed by pre-pit synchronization in 1 ECC block of RMD#3.

As described above, in state (a), the recording and reproduction circuit 5 (recording section) performs a recording operation for recording the management information in a predetermined position RMD#3 by data synchronization (i.e., based on the first synchronization signal). When the microcomputer 4 (determination section) determines that the recording operation was not normally terminated, the recording and reproduction circuit 5 performs a recording operation for recording the management information in a predetermined position RMD#3 by pre-pit synchronization (i.e., based on the second synchronization signal) in state (b).

State (c) shows the operation when the RMD also cannot be recorded by pre-pit synchronization. In state (c), the data which was tried to be recorded in RMD#3 is to be recorded in RMD#4. by pre-pit synchronization.

As described above, when the microcomputer 4 (determination section) determines that the recording operation in the predetermine position RMD#3 was not normally terminated by pre-pit synchronization, the recording and reproduction circuit 5 performs a recording operation for recording the management information in a position RMD#4 which is different from the predetermined position RMD#3 by pre-pit synchronization (i.e., based on the second synchronization signal) in state (c).

State (d) shows the operation when the RMD also cannot be recorded in RMD#4 by pre-pit synchronization. In state (d), the data which was tried to be recorded in RMD#3 is to be recorded in RMD#5 by pre-pit synchronization.

State (e) shows the operation when the RMD also cannot be recorded in RMD#5 by pre-pit synchronization. In state (3), the data which was tried to be recorded in RMD#3 is to be recorded in RMD#6 by pre-pit synchronization. Assuming that the upper limit of the number of areas to be skipped continuously is 3, if the RMD cannot be recorded in RMD#6, the updating of RMA ends in a failure ("yes" in step 1118 of FIG. 10) and the processing is abnormally terminated. In actuality, there is substantially no disc in which the recording operation ends in a failure in all of these methods. Therefore, the updating of the RMA is normally terminated in either one of states (b) through (e).

As described above, when the microcomputer 4 (determination section) determines that the recording operation of the management information in RMD#4 was not normally terminated by pre-pit synchronization, the recording and reproduction circuit 5 records the management information in different positions of the optical disc 3 until the recording operation is terminated normally, or until the number of recording operations reaches a predetermined number.

As a result, the data (latest management information) additionally recorded on the optical disc 3 as described above is connected to the old data (RMD) by data synchronization or pre-pit synchronization. When new RMD is connected to the old RMD by data synchronization, at least one block among a plurality of blocks included in the RMA has, recorded therein, data (new RMD) positioned with reference to the data (old RMD) recorded in the immediately forward block. Thus, the probability of the RMD (data representing the management information) being correctly read is increased. Therefore, data reliability is enhanced.

When there is an area in which data cannot be recorded due to some inconvenience, the area is left unrecorded, and the latest management information is recorded in the immediately following area. As a result, at least one block, among the plurality of blocks included in the RMA, following the unrecorded block is recorded.

As described above, according to the first example of the present invention, even when there is an area in a write once type information recording medium where it is difficult to record management information for the medium, the probability of the recording being successful is increased by dynamically selecting a suitable synchronization method before the start of recording. When there is an area to which recording is impossible by any synchronization method, the latest management information can be recorded in the immediately following area even when that area is left unrecorded.

The above description has been made regarding the recording management area (RMA), the principle of the present invention of dynamically selecting data synchronization and pre-pit synchronization is applicable to recording predetermined data other than user data in an area other than the area in which the user data is recorded (for example, recording 0 padding data in an area adjacent to the area in which the user data is recorded for closing the RZone or recording the same data in repetition in a lead-out area or a lead-in area, etc.).

EXAMPLE 2

Hereinafter, a recording method and a recording apparatus for recording data to a write once type information recording medium, and a write once type information recording medium according to a second example of the present invention will be described with reference to drawings.

An optical disc apparatus according to the second example has the same structure as that of the optical disc apparatus 2 shown in FIG. 8. The recording and reproduction circuit according to the second example has the same structure as that of the recording and reproduction circuit 5 shown in FIG. 9.

Figure 14:
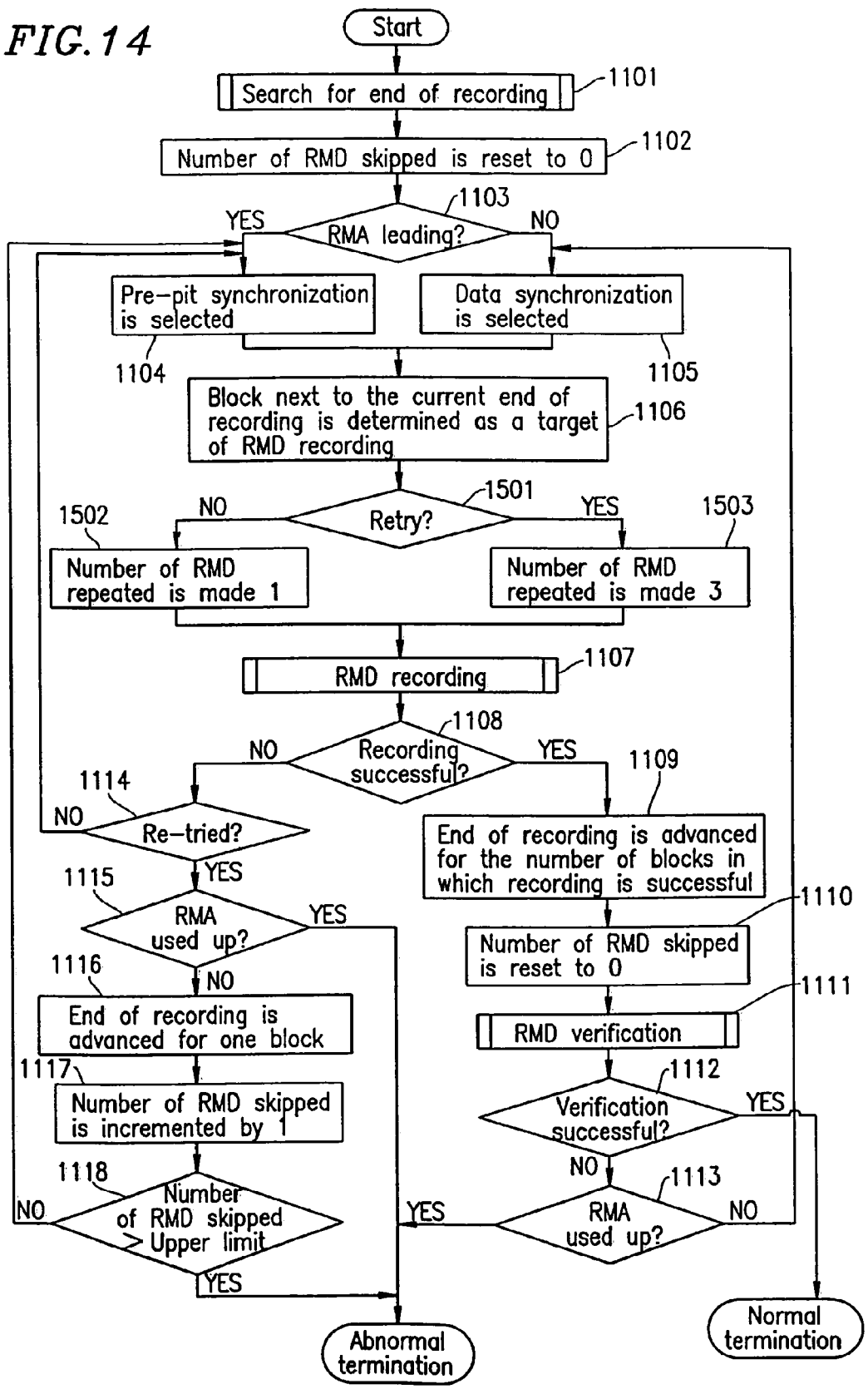
FIG. 14 is a flowchart illustrating processing of recording data in the RMA performed by the optical disc apparatus 2 according to a second example of the present invention.

FIG. 14 is a flowchart illustrating processing of recording data in the RMA performed by the optical disc apparatus 2 in the second example. In the second example, the same data is recorded in a plurality of continuous RMDs before the recording operation in the RMA is re-tried. In FIG. 14, identical steps with those in FIG. 10 bear identical reference numerals therewith, and will not described in detail.

Step 1501: It is determined whether the recording operation of the RMD to be performed in step 1107 is a re-try or not.

When the recording operation of the RMD is a re-try, this means that a recording operation for recording the same RMD somewhere in the RMA has already been tried. When "yes" in step 1501, the processing goes to step 1503. When "no" in step 1501, the processing goes to step 1502.

Step 1502: The number of RMD repeated is set to "1".

Step 1503: The number of RMD repeated is set to "3".

The number of RMD repeated which is set in step 1502 or 1503 is used in step 1107. In step 1107, the same RMD (management information) is recorded in continuous blocks of the number of RMD repeated.

Figure 15:
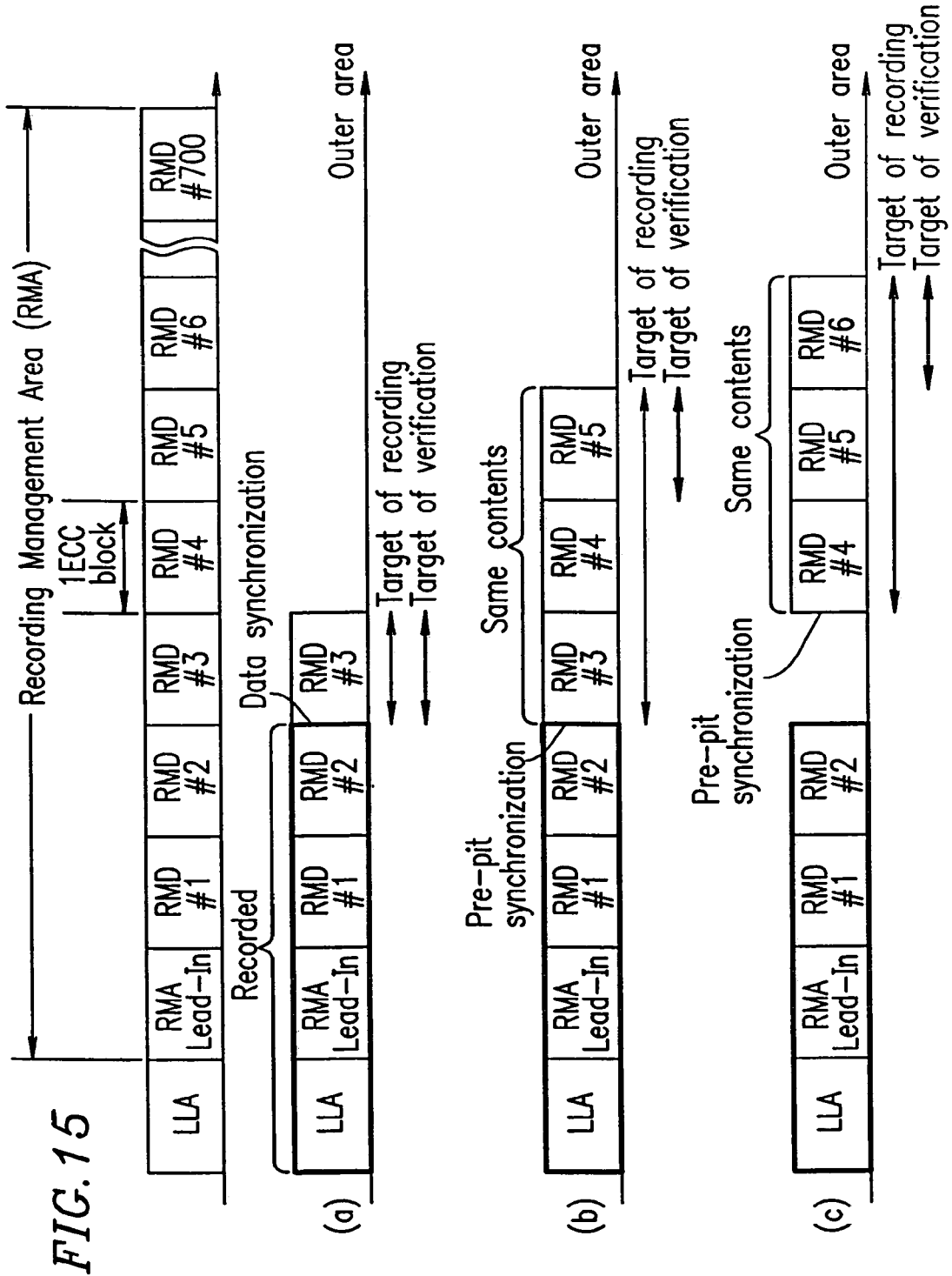
FIG. 15 shows a specific example of recording data in the RMA in accordance with the flowchart in FIG. 14.

FIG. 15 shows a specific example of recording data in the RMA in accordance with the flowchart in FIG. 14. In FIG. 15, areas surrounded by bold lines represent recorded blocks.

In State (a), the management information is normally recorded up to RMD#2. In state (a), the management information representing the latest recording state is to be recorded by data synchronization in 1 ECC block of RMD#3.

State (b) shows the operation when the recording operation in RMD#3 ended in a failure. The recording operation is to be performed continuously from the point at which the failure occurred. In step (b), the data which was tried to be recorded in RMD#3 is to be recorded in RMD#3, RMD#4 and RMD#5 by pre-pit synchronization.

As described above, when the recording operation in state (a) was not normally completed, the recording and reproduction circuit 5 (recording section) performs a recording operation of recording the same management information in each of at least two continuous blocks of the RMA.

Among RMD#3, RMD#4 and RMD#5, the data recorded in at least 1 ECC block of RMD#5 needs to be subjected to reproduction verification in step 1111 of FIG. 14 (i.e., the final management information recorded). RMD#3 and RMD#4 need not be a target or re-try even if data recorded therein is not reproduceable.

State (c) shows the operation when the RMD also cannot be recorded in RMD#3 by pre-pit synchronization. In state (c), the data which was tried to be recorded in RMD#3 is to be recorded in RMD#4, RMD#5 and RMD#6 by pre-pit synchronization. The data recorded in at least 1 ECC block of RMD#6 needs to be subjected to reproduction verification.

As described above, when the same management information (RMD) is recorded in a plurality of continuous blocks, at least the final management information recorded is subjected to reproduction verification.

In step 1111 (FIG. 14), the recording and reproduction circuit 5 acts as a verification section for performing reproduction verification of the final management information recorded among the management information recorded in the plurality of continuous blocks.

Figure 16:
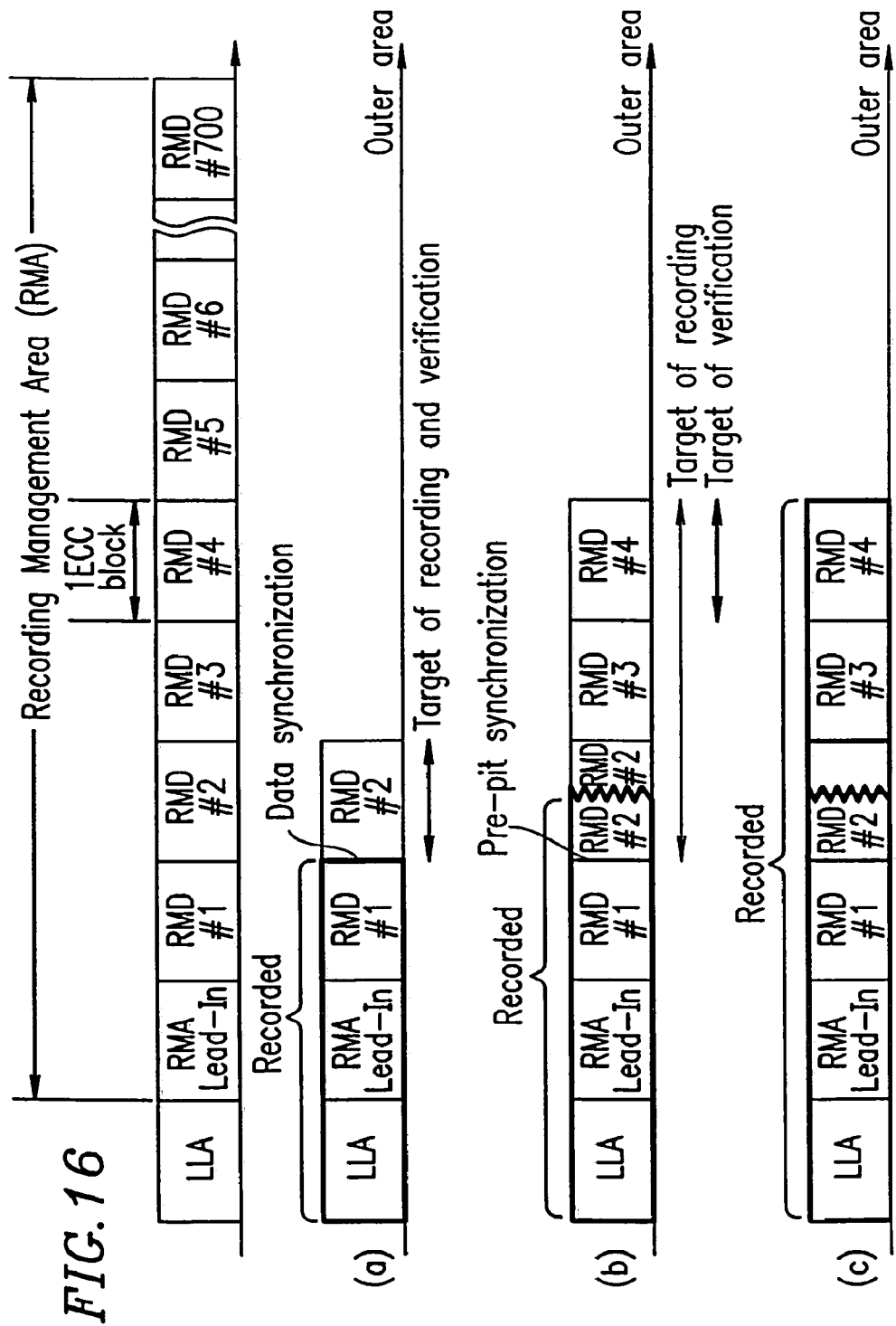
FIG. 16 shows a specific example of recovering the RMA in accordance with the flowchart in FIG. 14.

FIG. 16 shows a specific example of recovering the RMA in accordance with the flowchart in FIG. 14. In FIG. 16, areas surrounded by bold lines represent recorded blocks.

In State (a), the management information is normally recorded up to RMD#1. In state (a), the management information representing the latest recording state is to be recorded by data synchronization in RMD#2.

State (b) shows the operation when the recording operation in RMD#2 ended in a failure (when the recording operation was interrupted). The recording operation is to be performed continuously from the point at which the failure occurred, so that the RMA is recovered. In step (b), the data which was tried to be recorded in RMD#2 is to be recorded in RMD#2, RMD#3 and RMD#4 by pre-pit synchronization.

Among RMD#2, RMD#3 and RMD#4, the data recorded in at least 1 ECC block of RMD#4 needs to be subjected to reproduction verification. RMD#3 need not be a target or re-try even if data recorded therein is not reproduceable.

State (c) shows the recovered RMA by the re-try. operation

The write once type information recording medium data having data recorded as described above has the same management information in at least two continuous blocks among the plurality of blocks included in the RMA (for example, RMD#3 and RMD#4 shown in state (c) of FIG. 16). The recording operation to the continuous blocks is preferably performed without interruption. The reason is because when the recording operation is performed in continuous blocks without interruption, no connecting point is caused by data linking at the boundary between blocks.

By the method for recovering the RMA described with reference to FIG. 16, an area (block) which needs to have RMD necessarily has RMD recorded therein. This provides an advantage of less reading errors being made by the reproduction apparatus as compared to the method of filling the area rearward to the position at which the recording is interrupted with specific data (for example, "0")). The method of filling such an area with "0" involves a risk that a reproduction apparatus produced in conformity to the standards may interpret "0" as the RMD.

When the recording operation is performed in a plurality of continuous blocks without interruption, the final RMD recorded (for example, the RMD in RMD#4 in FIG. 16) is recorded without linking. Therefore, a bit shift does not occur in the first frame of the RMD, and an error correction capability is not consumed by such a bit shift. Thus, the reliability of the data (RMD) recorded on the optical disc 3 is enhanced.

EXAMPLE 3

Hereinafter, a reproduction method and a reproduction apparatus for reproducing data from a write once type information recording medium according to a third example of the present invention will be described with reference to drawings.

An optical disc apparatus according to the third example has the same structure as that of the optical disc apparatus 2 shown in FIG. 8.

Figure 17:
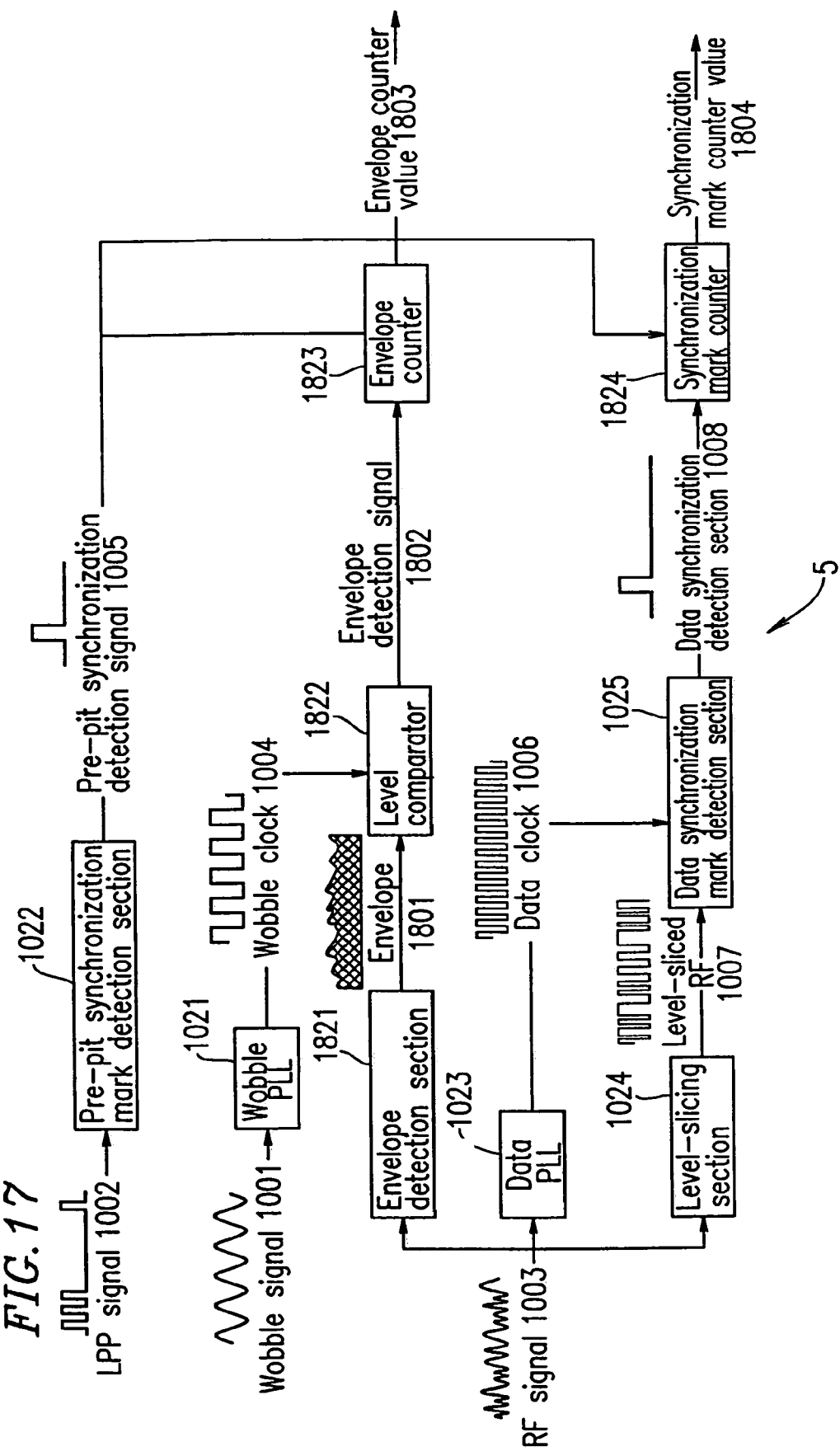
FIG. 17 is a block illustrating a function of the recording and reproduction circuit 5 used for determining whether a sector in the optical disc 3 is recorded or not.

FIG. 17 is a block diagram illustrating a function used for determining whether a sector in the optical disc 3 is recorded or not. In FIG. 17, identical elements with those in FIG. 9 bear identical reference numerals therewith, and will not described in detail. The elements which are not included in FIG. 9 are hatched.

An RF signal 1003 is input to an envelope detection section 1821. The envelope detection section 1821 outputs an envelope 1801, which represents a change in the amplitude of the input signal. A level comparator 1822 samples the envelope 1801 at a cycle of the wobble clock 1004. When the envelope 1801 exceeds a predetermined value, the level comparator 1822 outputs an envelope detection signal 1802.

An envelope counter 1823 increments a counter value by 1 in response to the envelope detection signal 1802, and resets the counter value in response to the pre-pit synchronization detection signal 1005. The counter value of the envelope counter 1823 is output as an envelope counter value 1803.

A synchronization mark counter 1824 increments a counter value by 1 in response to the data synchronization detection signal 1008, and resets the counter value in response to the pre-pit synchronization detection signal 1005. The counter value of the synchronization mark counter 1824 is output as an envelope counter value 1804.

The microcomputer 4 (FIG. 8) can determine whether the section in the optical disc 3 is already recorded or not at the cycle of pre-pit synchronization (i.e., at the sector cycle) by using either or both of the envelope counter value 1803 and the synchronization mark counter value 1804.

The reproduction apparatus in the third example is used for appropriately searching for the finally recorded area even when the recording apparatus in the first or the second example records data so that the optical disc has an unrecorded area in the RMA (see states (c) through (e) of FIG. 13). Such a search is performed in step 1101 of FIG. 10 (first example) and of FIG. 14 (second example).

The method of performing such a search in the third example of the present invention includes two stages of (1) narrowing down areas including ends of the recording (rough search processing) and (2) detecting, in units of sectors, ends of the recording from the narrowed-down areas (precise search processing).

As described in the first and second examples, the optical disc apparatus 2 can possibly record data on an optical disc so that the optical disc includes an unrecorded block between two recorded blocks. For reproducing the latest RMD, the end of the recording needs to be searched for in consideration of such a case. The number of continuous unrecorded blocks between the recorded blocks never exceeds the upper limit used in step 1118 (FIGS. 10 and 14). The continuous unrecorded blocks of a number equal to or smaller than the upper limit should be "ignored" in searching for the end of the recording.

Figure 18:
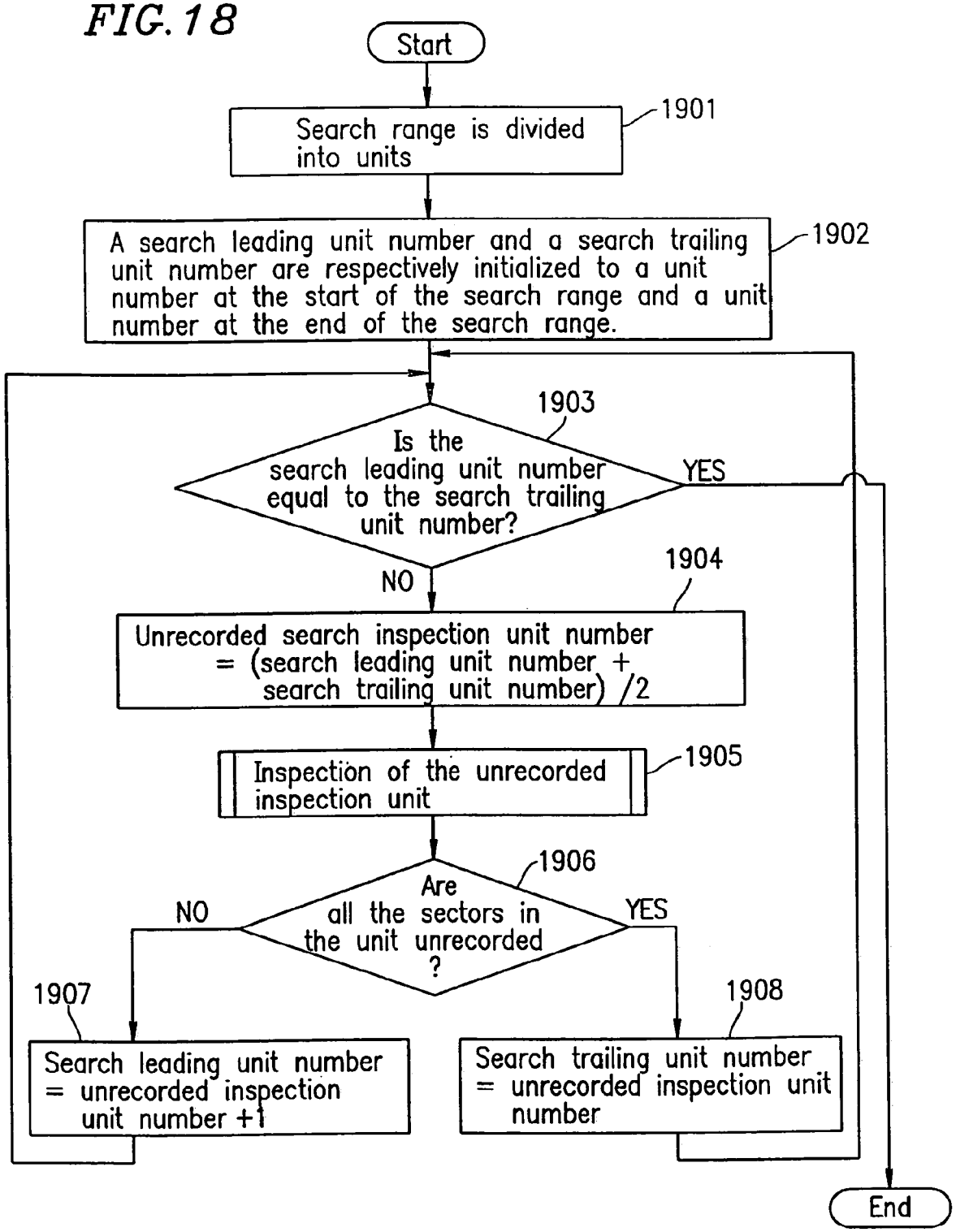
FIG. 18 is a flowchart illustrating rough search processing for narrowing down areas including ends of the recording.

FIG. 18 is a flowchart illustrating rough search processing for narrowing down areas including ends of the recording.

Step 1901: A search range (in which ends of the recording are searched for) is grouped into units. One unit includes a predetermined number of sectors. The number of sectors included in one unit is set to be a number corresponding to the number of blocks obtained by adding 1 to the number of unrecorded blocks to be ignored.

Step 1902: A search leading unit number and a search trailing unit number are respectively initialized to a unit number at the start of the search range and a unit number at the end of the search range. This means that the search range is the entirety of RMA.

Step 1903: It is determined whether the search leading unit number is equal to the search end unit number or not. When "yes" in step 1903, the processing is terminated. When "no" in step 1903, the processing goes to step 1904.

Step 1904: An unrecorded inspected unit number is set to be a value obtained by adding the search leading unit number and the search trailing unit number and dividing the sum by 2. The unrecorded inspected unit number represents the number of a unit, for which it is inspected whether data is recorded or not. In this arithmetic operation, the figures below the decimal point are omitted so as to form an integer.

Step 1905: The unrecorded inspected unit is inspected. In step 1905, the circuit shown in FIG. 17 is used to inspect whether each of all the sectors included in the unrecorded inspected unit number has been recorded or not.

Step 1906: It is determined whether all the sectors in the unrecorded inspected unit are unrecorded or not. When "yes" in step 1906, the processing goes to step 1908. When "no" in step 1906, the processing goes to step 1907.

Step 1907: The search leading unit number is set to be a value obtained by adding 1 to the unrecorded inspected unit number.

Step 1908: The search trailing unit number is set to be the unrecorded inspected unit number.

The processing shown in FIG. 18 is performed by the microcomputer 4 (FIG. 8). The microcomputer 4 performs the processing shown in FIG. 18 to act as a specification section for specifying the final block in which the management information was recorded. The specification section specifies a recorded block, including continuous unrecorded sectors of a number equal to or greater than a predetermined number, as the final block in which the management information was recorded.

The management information recorded in the specified block is reproduced by the recording and reproduction circuit (reproduction section).

The entirety of the processing of steps 1903 through 1908 shown in FIG. 18 corresponds to a step of finding the boundary between a unit, all the sectors in which are unrecorded, and a unit, at least one sector in which is unrecorded by binary search.

Figure 19:
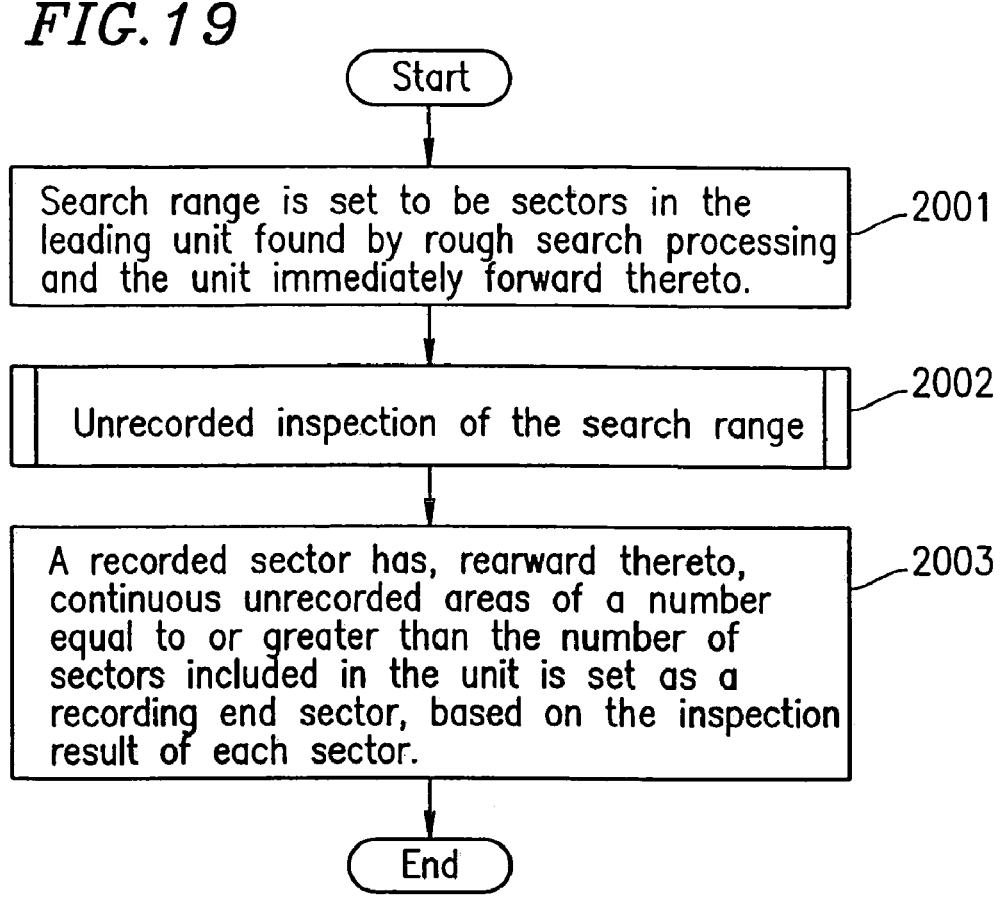
FIG. 19 is a flowchart illustrating precise search processing for detecting, in units of sectors, ends of the recording from the narrowed-down areas.

FIG. 19 is a flowchart illustrating precise search processing for detecting, in units of sectors, ends of the recording from the narrowed-down areas.

Step 2001: The search range is set to be sectors in the leading unit found by rough search processing and the unit immediately forward thereto.

Step 2002: Using the circuit shown in FIG. 17, it is inspected whether all the sectors in the search range are recorded or not.

Step 2003: Based on the inspection result of each sector, a recorded sector which has, rearward thereto, continuous recorded areas of at least the number of the sectors forming a unit (a recorded sector followed by continuous unrecorded sectors of the number of sectors forming a unit) is set as a recording end sector.

The processing shown in FIG. 19 is performed by the microcomputer 4 (FIG. 8). As described above, the microcomputer 4 (specification section) determines whether each of all the sectors included in two units adjacent to each other while interposing a boundary between a recorded unit and an unrecorded unit is recorded or not.

Figure 20:
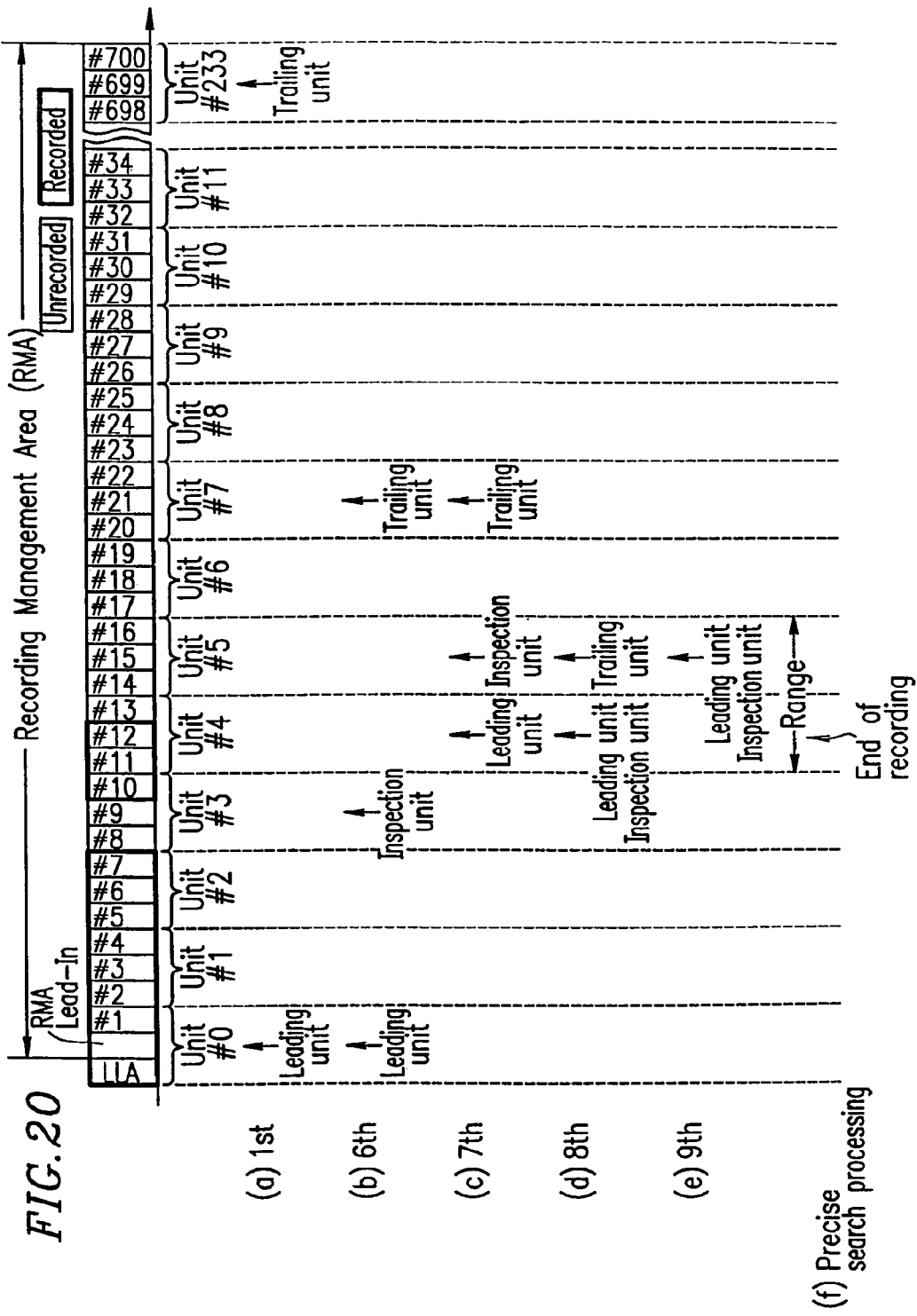
FIG. 20 illustrates an operation of searching performed for the recording management area (RMA) in accordance with the flowcharts in FIGS. 18 and 19.

FIG. 20 illustrates an operation of searching performed for the recording management area (RMA) in accordance with the flowcharts in FIGS. 18 and 19. In the state shown in FIG. 20, the RMA is updated up to RMD#12, but RMD#8 and RMD#9 are skipped while being unrecorded. The number of sectors or blocks included in one unit equals the upper limit of the RMD skipped. The unit number starts with 0.

The first search operation is performed after the leading unit number is initialized to 0 and the trailing unit number is initialized to 233, which represents the trailing unit ((a) in FIG. 20). Each time the search operation is repeated, the trailing unit number changes.

The trailing unit number is 116 (=233/2) before the second search operation, 58 before the third search operation, 29 before the fourth search operation, 14 before the fifth search operation, and 7 before the sixth search operation ((b) in FIG. 20). At the sixth search operation, a part of the sectors in the unit to be inspected (unit number 3) has been recorded. Therefore, before the seventh search operation, the leading unit number is 4, and the trailing unit number is 7 ((c) in FIG. 20). At the seventh search operation, the unit number to be inspected is 5, and all the sectors in the unit to be inspected (unit number 5) are unrecorded. Accordingly, before the eighth search operation, the leading unit number is 4, and the trailing unit number is 5 ((d) in FIG. 20). At the eighth search operation, the unit number to be inspected is 4, and a part of the sectors in the unit to be inspected (unit number 4) has been recorded. Accordingly, before the ninth search operation, the leading unit number and the trailing unit number are both 5, and rough search processing is terminated ((e) in FIG. 20).

The precise search range corresponds to sectors included in the leading unit (unit number 5) and the unit immediately forward thereto (unit 4). A recorded sector which is followed by continuous unrecorded areas of a number equal to or greater than the number of sectors included in the unit is determined to be the final sector of RMD#12.

Figure 21:
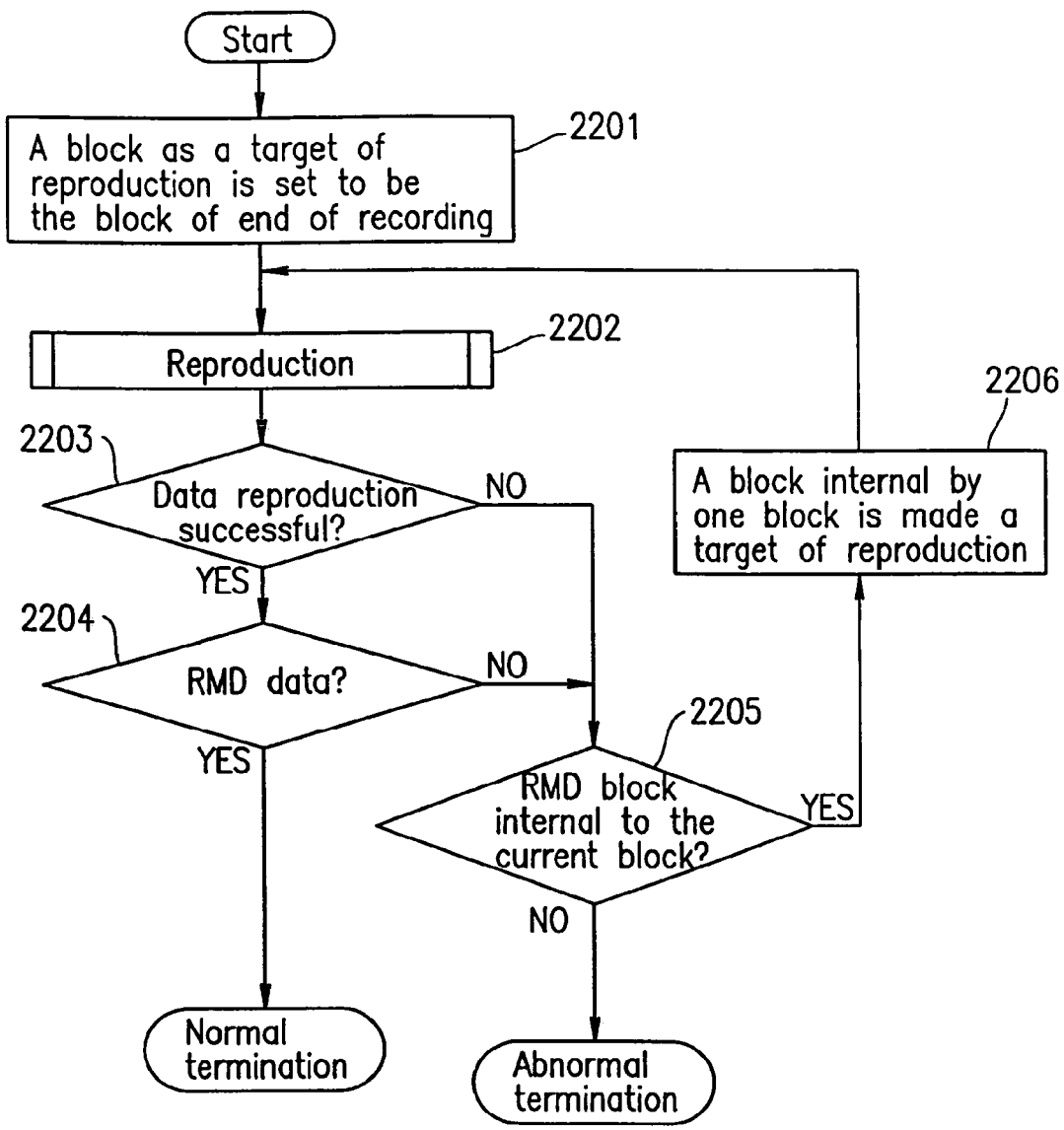
FIG. 21 is a flowchart illustrating processing for reading newer RMD.

FIG. 21 is a flowchart illustrating processing for reading newer RMD. The processing shown in FIG. 21 is performed after the end of the recording of the RMA is determined.

Step 2201: A block as a target of reproduction is set to be the recorded ECC block located rearmost (final ECC block).

Step 2202: The block specified by step 2201 is reproduced.

In steps 2201 and 2202, the recording and reproduction circuit 5 acts as a reproduction section for reproducing management information recorded in the block located rear most among a plurality of blocks included in the RMA.

Step 2203: It is determined whether data reproduction has been successful or not. When "yes" in step 2203, the processing goes to step 2204. When "no" in step 2203, the processing goes to step 2205.

The determination in step 2203 is performed by the microcomputer 4 (FIG. 8). In step 2203, the microcomputer 4 acts as a determination section for determining whether the reproduction operation was normally terminated or not.

Step 2204: It is determined whether the reproduced data is RMD or not. This determination is performed by, for example, determining whether the reproduced data includes an identifier representing the RMD. For example, when the reproduced data includes 0 padding data, the reproduced data is determined not to be the RMD. When "yes" in step 2204, the processing is terminated (normal termination). When "no" in step 2204, the processing goes to step 2205.

Step 2205: It is determined whether there is an ECC block having RMD radially inner with respect to the currently processed block. When "yes" in step 2205, the processing goes to step 2206. When "no" in step 2205, the processing is terminated (abnormal termination). Namely, reproduction of RMD ends in a failure.

Step 2206: An ECC block which is radially inner with respect to the previously processed ECC block by one ECC block is made a target of reproduction.

In steps 2202 through 2206, the recording and reproduction circuit 5 (reproduction section) performs a reproduction operation of reproducing management information recorded in the plurality of recorded blocks in the RMA sequentially from the rearmost block, until the reproduction operation is normally terminated.

Figure 22:
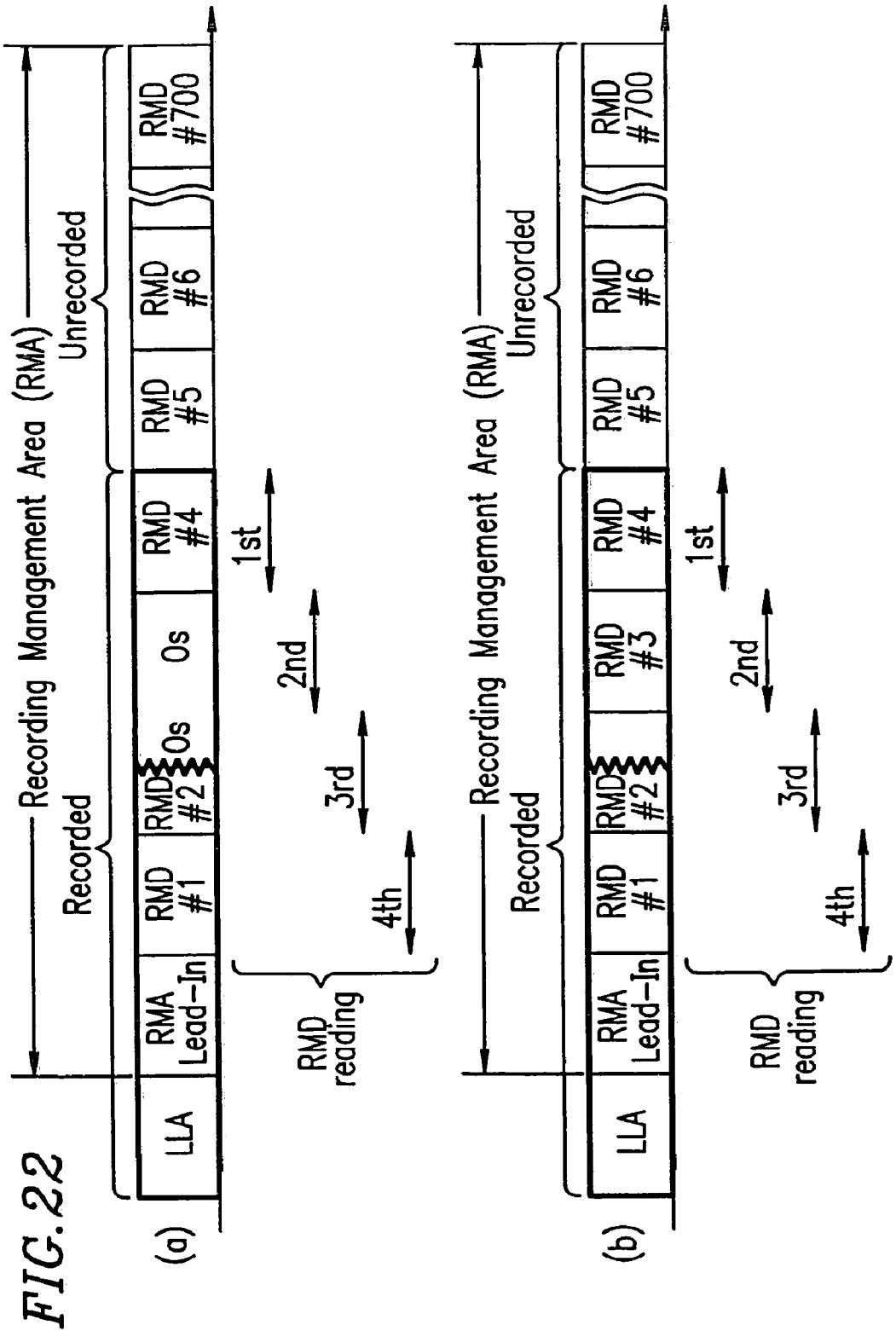
FIG. 22 shows a specific example of trying reproducing RMD in accordance with the flowchart shown in FIG. 21.

FIG. 22 shows a specific example of trying reproducing RMD in accordance with the flowchart shown in FIG. 21. In state (a), the RMA is recovered by 0 padding data when the recording of data in RMD#2 was interrupted. In state (b), the RMA is recovered by the method described in the second example described with reference to FIG. 16 when the recording of data in RMD#2 was interrupted.

In state (a), the first reproduction operation (step 2202 in FIG. 21) is performed for RMD#4. When reproduction of RMD#4 ends in a failure ("no" in step 2203 of FIG. 21), the second reproduction operation is performed for RMD#3.

The ECC block of RMD#3 is filled with 0 padding data for recovery. The data in this ECC block is determined not to be RMD ("no" in step 2204 of FIG. 21). Therefore, the third reproduction operation is performed for RMD#2.

Since the RMD#2 is broken in the middle, reproduction of RMD#2 does not succeed ("no" in step 2203 of FIG. 21). Therefore, the fourth reproduction operation is performed for RMD#1.

When reproduction of RMD#1 ends in a failure ("no" in step 2203 of FIG. 21), it is determined that there is no RMD radially inner with respect to RMD#1 ("no" in step 2205 of FIG. 21). Therefore, the processing is abnormally terminated (abnormal termination).

In state (b), the first reproduction operation (step 2202 of FIG. 21) is performed for RMD#4. When reproduction of RMD#4 ends in a failure ("no" in step 2203 of FIG. 21), the second reproduction operation is performed for RMD#3.

RMD#3 is an ECC block having the same data as RMD#4. When reproduction of RMD#3 ends in a failure ("no" in step 2203 of FIG. 21), the third reproduction operation is performed for RMD#2.

Since the RMD#2 is broken in the middle, reproduction of RMD#2 does not succeed ("no" in step 2203 of FIG. 21). Therefore, the fourth reproduction operation is performed for RMD#1.

When reproduction of RMD#1 ends in a failure ("no" in step 2203 of FIG. 21), it is determined that there is no RMD radially inner with respect to RMD#1 ("no" in step 2205 of FIG. 21). Therefore, the processing is abnormally terminated (abnormal termination). Namely, reproduction of RMD ends in a failure.

According to the third example of the present invention, as can be appreciated from (a) and (b) of FIG. 22, both an RMA recovered by being filled with 0 padding data or an RMA recovered in accordance with the second example of the present invention can be used to reproduce new RMD to the maximum possible degree.

Comparing (a) and (b) of FIG. 22, the RMA recovered in accordance with the second example of the present invention is expected to cause more accurate RMD (latest management information) to be reproduced from RMD#3 than the RMA recovered by being filled with 0 padding data. Therefore, the RMA recovered in accordance with the second example of the present invention has a higher probability of causing newer RMD to be reproduced.

As described above, according to the third example of the present invention, a boundary, between a recorded area and an unrecorded area, which is followed by continuous unrecorded areas of a predetermined number or larger can be found. For example, even in a disc in which an unrecordable area is skipped and the latest management information is recorded in an area rearward to the skipped area in the first example, an area to which the latest management information is to be recorded can be found.

EXAMPLE 4

Hereinafter, a reproduction method and a reproduction apparatus for reproducing data from a write once type information recording medium according to a fourth example of the present invention will be described with reference to drawings.

An optical disc apparatus according to the fourth example has the same structure as that of the optical disc apparatus 2 shown in FIG. 8.

Figure 23:
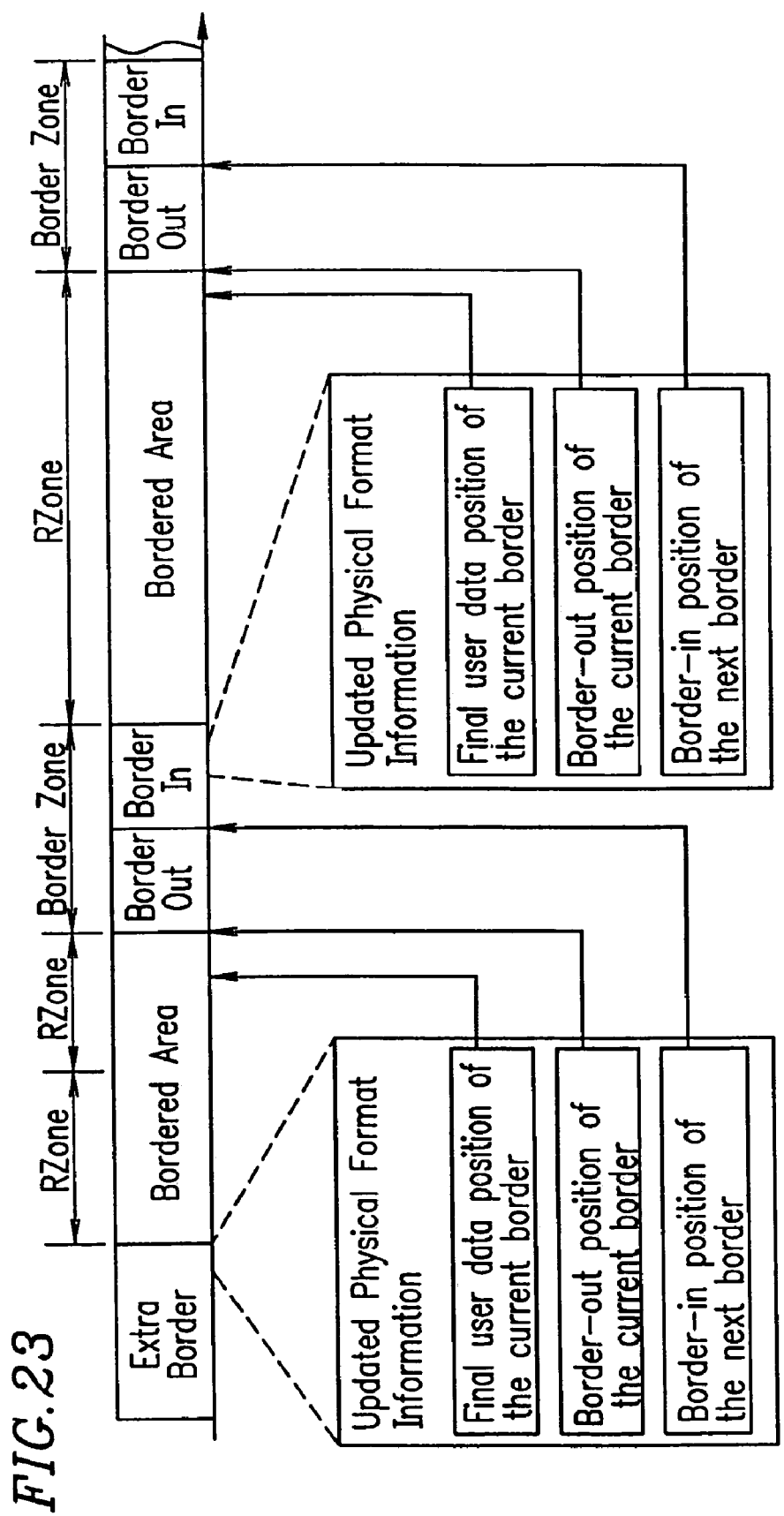
FIG. 23 illustrates second management information to be recorded in a write once type information recording medium.

FIG. 23 illustrates second management information to be recorded in a write once type information recording medium. Second management information is recorded in an extra border zone and a border-in area. The second management information is, for example, updated physical format information.

Figure 1:
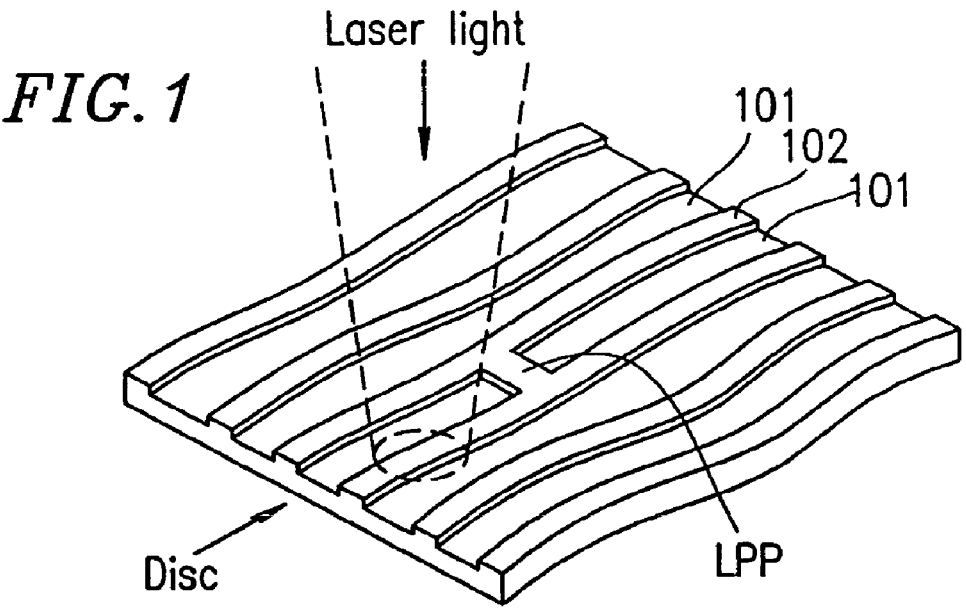
FIG. 1 schematically shows a recording face of a DVD-R disc.
Figure 2:
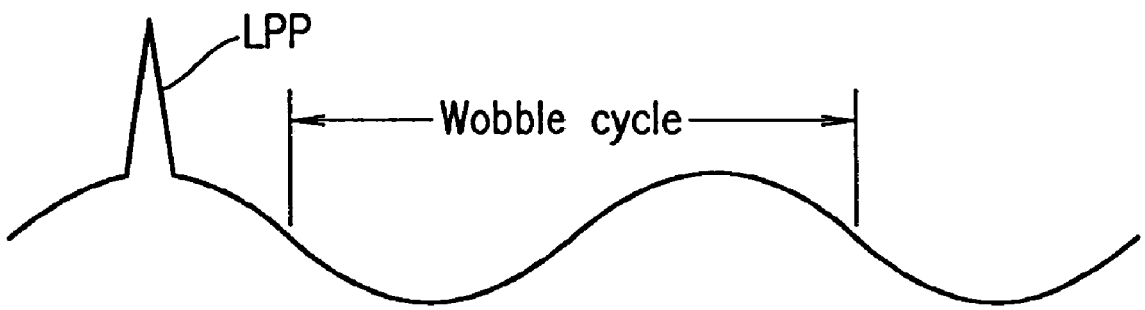
FIG. 2 shows a waveform of a tracking error signal obtained by light reflected by the DVD-R disc.
Figure 3:
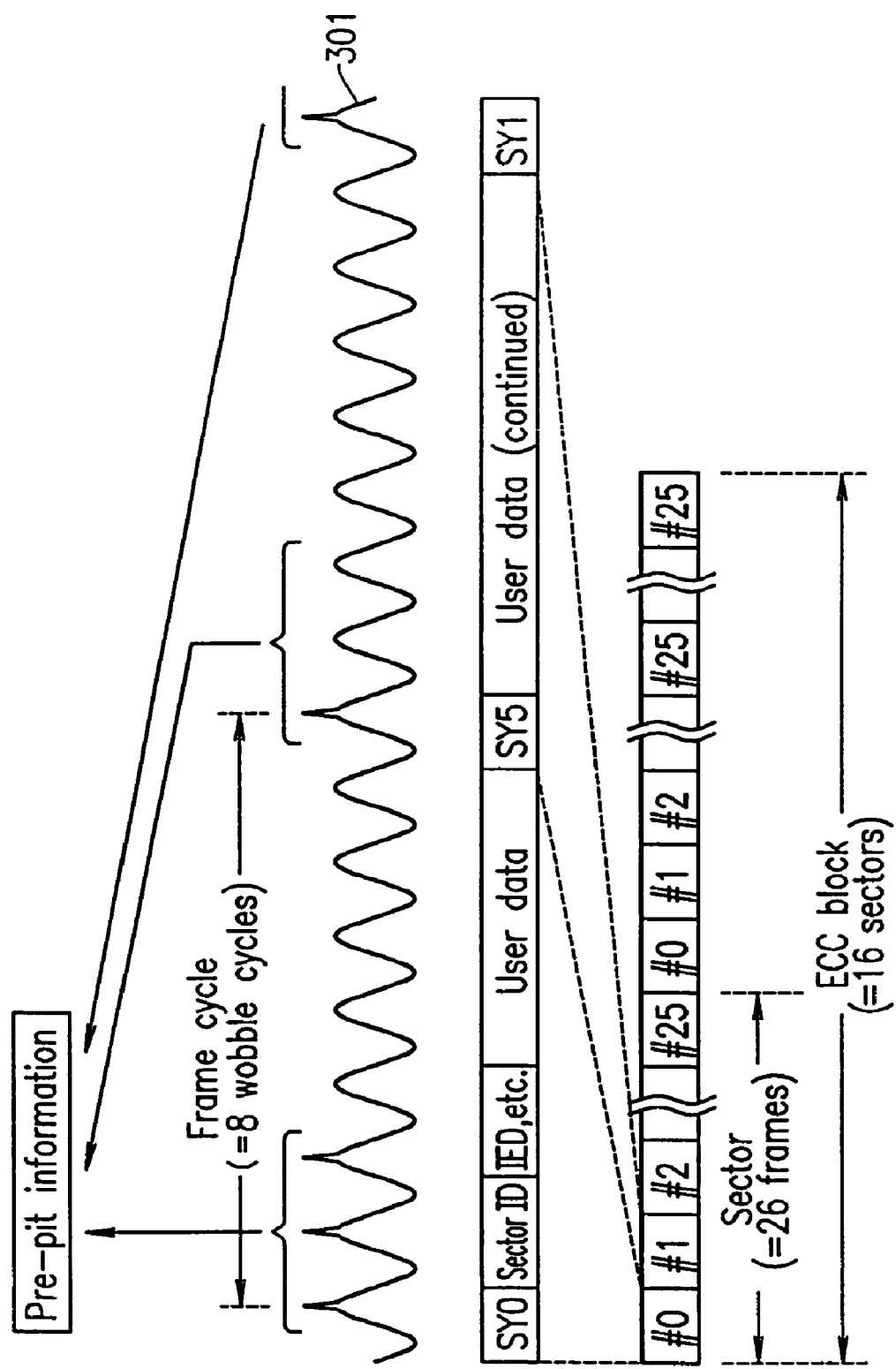
FIG. 3 shows the relationship between the information on cutting in the DVD-R disc and the information to be additionally recorded.
Figure 4:
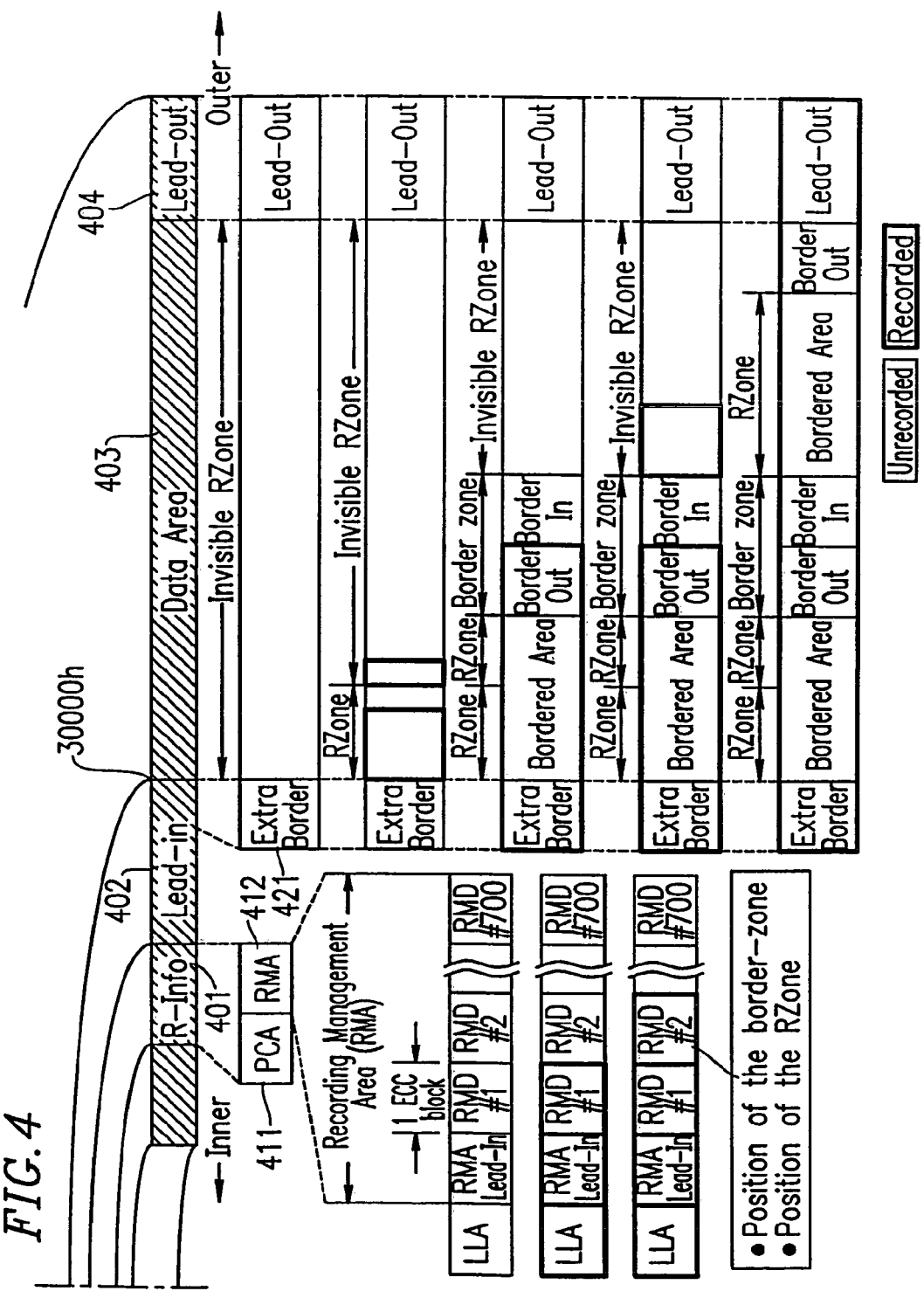
FIG. 4 schematically shows additional recording of information on a DVD-R disc.

The updated physical format information is recorded after a bordered area interposed between the extra border zone or the border-in area and the border-out area is recorded. The updated physical format information represents the position of the final user data recorded in the bordered area, the position of the border-out area of the current border, and the expected position of the border-in area of the next border. As shown in FIG. 4, a plurality of bordered areas are distributed over the data area. The term "distributed" refers to a state where a plurality of areas exist without being adjacent to each other.

User data is recorded in the bordered area. The updated physical format information is recorded in a border zone, which interposes a bordered area with another border area and acts as a buffer area. Accordingly, the updated physical format information is considered to be information representing the recording state of the optical disc 3, which is recorded on the optical disc 3 in relation with the user data.

Even a reproduction apparatus without a function of reproducing the RMA can recognize the range of the user data by reading the updated physical format information from the extra border zone to the outer border-in area.

A reproduction apparatus having a function of reproducing the RMA does not need to read the updated physical format information, as long as the latest RMD is reproduceable. The reason is because the data included in the updated physical format information can be obtained from the latest RMD. However, the latest RMD is not necessarily reproduceable. When the latest RMD cannot be reproduced for some reason (for example, stain on the surface of the disc), the updated physical format information is useful.

Figure 24:
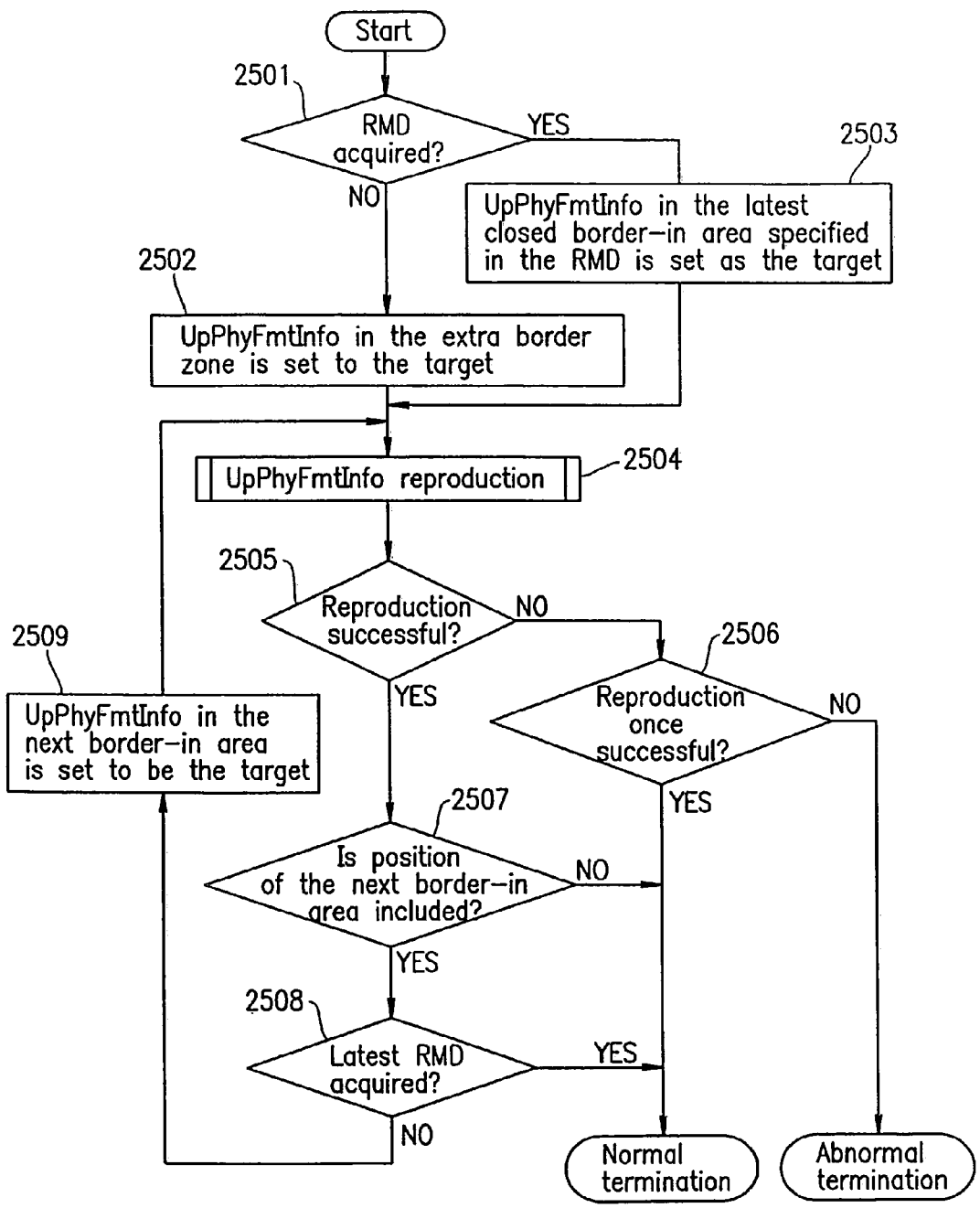
FIG. 24 is a flowchart illustrating reproduction processing of the second management information in accordance with the reproduction state of the management information.

FIG. 24 is a flowchart illustrating reproduction processing of the second management information in accordance with the reproduction state of the management information. Here, the management information (first management information) represents RMD, and the second management information represents the updated physical format information. The RMD and the updated physical format information both represent a recording state of the optical disc (information recording medium).

In FIG. 24, the updated physical format information is referred to as an UpPhyFmtInfo.

Step 2501: It is determined whether some RMD has been acquired or not. When "yes" in step 2501, the processing goes to step 2053. When "no" in step 2501, the processing goes to step 2502.

The acquirement (reproduction) of the RMD (first management information) is performed by the recording and reproduction circuit shown in FIG. 5.

Step 2502: The updated physical format information in the extra border zone is set to be a target of reproduction.

Step 2503: The updated physical format information in the border-in area of the outermost (latest) closed border specified in the RMD is set as a target. Thus, in steps 2502 and 2503, the microcomputer 4 acts as a specification section for specifying one of the plurality of areas.

Step 2504: The updated physical format information of the target of reproduction is reproduced.

Step 2505: It is determined whether reproduction has been successful or not. When "yes" in step 2505, the processing goes to step 2507. When "no" in step 2505, the processing goes to step 2506.

Step 2506: It is determined whether reproduction of the updated physical format information succeeded at least once or not. When "yes" in step 2506, the processing is terminated (normal termination). When "no" in step 2506, the processing is terminated (abnormal termination).

Step 2507: It is determined whether the updated physical format information which was successfully reproduced represents the position of the border-in area of the next border or not. When "yes" in step 2507, the processing goes to step 2508. When "no" in step 2507, the processing is terminated (normal termination).

Step 2508: It is determined whether the latest RMD has been acquired or not (whether reproduction of the latest RMD succeeded or not). When "yes" in step 2508, the processing is terminated (normal termination) since the updated physical format is read from the outermost border-in area. When "no" in step 2508, the processing goes to step 2509.

Step 2509: The updated physical format information in the border-in area of the next border is set as a target of reproduction. The position of the next border is represented by the updated physical format information.

The order of the operations shown in FIG. 24 can be varied appropriately. For example, the determination in step 2508 may be performed before the determination in step 2501.

Figure 25:
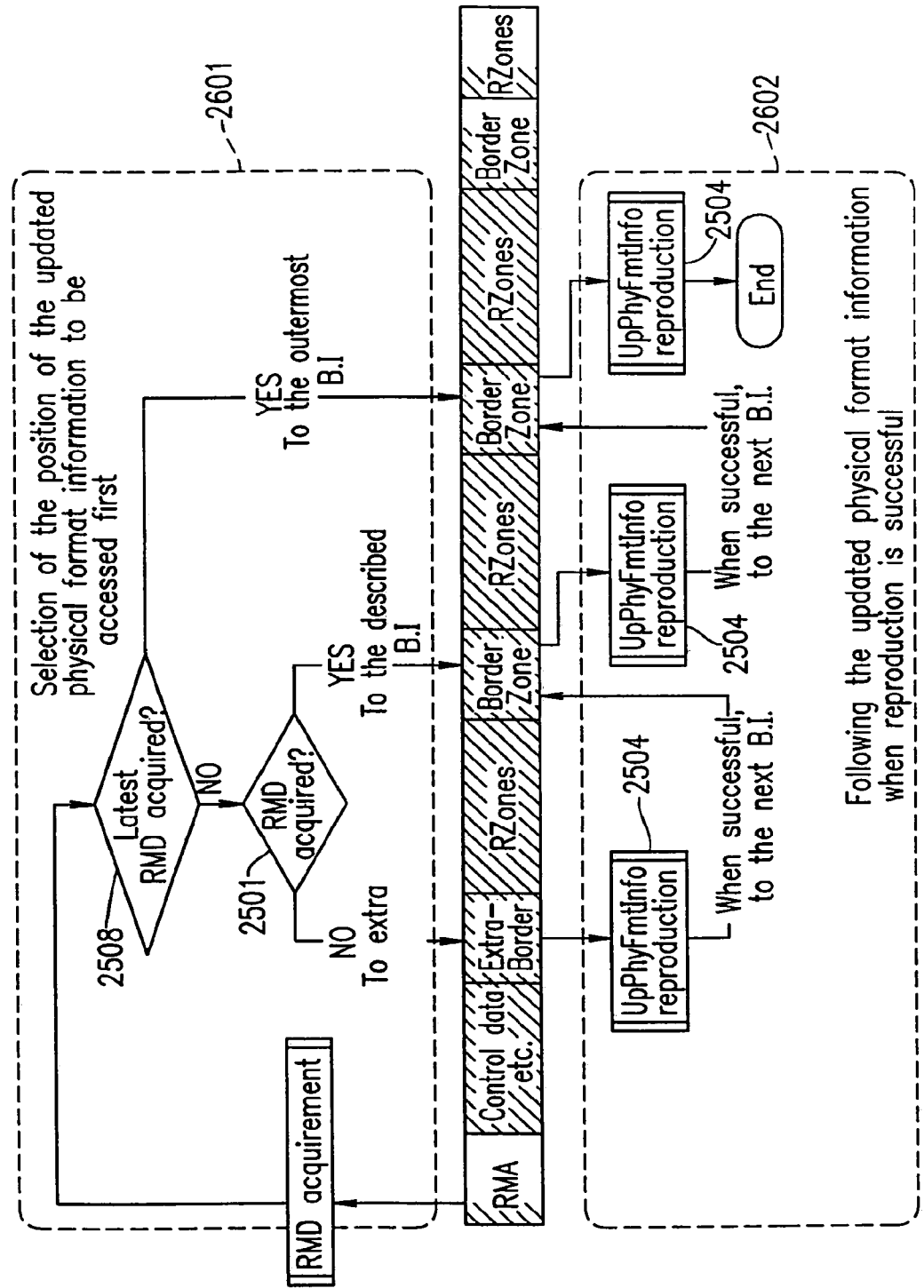
FIG. 25 shows the reproduction order of the updated physical format information in accordance with the flowchart in FIG. 24.

FIG. 25 shows the reproduction order of the updated physical format information in accordance with the flowchart in FIG. 24. In the example shown in FIG. 25, three borders of the optical disc are closed. In FIG. 25, the steps shown in FIG. 24 are shown with identical reference numerals therewith.

Part 2601 shows a procedure of selecting the position of the updated physical format information to be accessed first. When the latest RMD is reproduced ("yes" in step 2508 of FIG. 24), it is appreciated that the latest physical format information is in the border-in area of the third border from the content of the RMD.

When the latest RMD is not reproduced ("no" in step 2508 of FIG. 24) but the old RMD is reproduceable ("yes" in step 2501 of FIG. 24), the updated physical format information in the border represented by the old RMD is reproduced.

Part 2602 shows a procedure of following the updated physical format information from the inner border to the outer border (from the forward border to the rearward border).

When the old RMD is reproduced, and the RMD indicates that borders up to the second border have been closed, the updated physical format information of the second border is reproduced. Then, the updated physical format information of the third border is reproduced, and reproduction of the updated physical format information of the fourth border is tried. Since the fourth border has not been closed, the updated physical format information of the third border is recognized as the latest updated physical format information. As a result, the reproduction apparatus can reproduce all the user data of the third border. Thus, the recording and reproduction circuit 5 (FIG. 8) reproduces the updated physical format information (second management information) recorded in the plurality of border-in areas from the area represented by the acquired RMD (border-in area) rearward sequentially.

As described above, according the fourth example of the present invention, the latest updated physical format information can be acquired by trying a smaller number of times than the number of times necessary when the updated physical format information in all the areas is tried from the beginning (from the updated physical format information in the extra border zone). Accordingly, the latest updated physical format information can be acquired more rapidly. Even when the latest updated physical format information cannot be acquired, the user data in all the closed borders can be reproduced.

In the fourth example, updated physical format information is described as the second management information. The second management information is not limited to this. As the second management information, any management information recorded in distributed areas in the data area of the optical disc 3 (write only type information recording medium) is usable. For example, in the case of a DVD-R disc, the second management information may be a duplicate of RMD recorded in each border-out area.

According to a recording method of the present invention, a recording operation is performed for recording management information at a predetermined position of an information recording medium based on a first synchronization signal. When this operation is not terminated normally, a recording operation is performed for recording management information at the predetermined position based on a second synchronization signal. Thus, the probability of recording succeeding is increased, and reliability of data representing the recorded management information is enhanced.

According to a recording method of the present invention, a recording operation is performed for recording management information at a predetermined position of an information recording medium based on a first synchronization signal. When this operation is not terminated normally, a recording operation is performed for recording management information at a different position. Thus, the probability of recording succeeding is increased, and reliability of data representing the recorded management information is enhanced.

According to a recording method of the present invention, a recording operation in a prescribed block of an information recording medium is performed. When this operation is not terminated normally, a recording operation is performed for recording the same management information in each of at least two continuous blocks among a plurality of blocks. Thus, reliability of data representing the recorded management information is enhanced.

According to a reproduction method of the present invention, a recorded block followed by continuous unrecorded sectors of a prescribed number or larger is specified as the final block in which the management was recorded. Thus, even when the RMA includes an unrecorded block in the middle, the final block in which the management was recorded can be correctly specified.

According to a reproduction method of the present invention, a reproduction operation is performed for reproducing management information recorded in a plurality of recorded blocks sequentially from the rearmost block, until the reproduction operation is terminated normally.

According to a reproduction method of the present invention, at least one piece of the first management information is reproduced, and one of a plurality of areas is specified based on the at least one piece of the first management information. Then, second management information is reproduced in a plurality of areas rearward sequentially from the specified area. Thus, the latest management information can be acquired more rapidly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reproduction method for reproducing management information recorded on a write once type information recording medium and representing a recording state of the information recording medium, wherein:
   the information recording medium includes a management information area, and
   the management information area includes a plurality of continuous blocks, each of which is usable for recording the management information,
   the reproduction method comprising the steps of:
   (a) performing a reproduction operation for reproducing the management information recorded in a rearmost block among recorded blocks of the plurality of blocks;
   (b) determining whether the reproduction operation in step (a) is normally terminated or not;
   (c) when the reproduction operation in step (a) is not normally terminated, performing a reproduction operation for reproducing the management information recorded in the recorded blocks among the plurality of blocks sequentially from a rearmost block, until the reproduction operation is normally terminated.

2. A reproduction apparatus for reproducing management information, recorded on a write once type information recording medium and representing a recording state of the information recording medium, wherein:
   the information recording medium includes a management information area, and
   the management information area includes a plurality of continuous blocks, each of which is usable for recording the management information,
   the reproduction apparatus comprising:
   a reproduction section for performing a reproduction operation for reproducing the management information recorded in a rearmost block among recorded blocks of the plurality of blocks; and
   a determination section for determining whether the reproduction operation is normally terminated or not,
   wherein when the reproduction operation is not normally terminated, the reproduction section further performs a reproduction operation for reproducing the management information recorded in the recorded blocks among the plurality of blocks sequentially from a rearmost block, until the reproduction operation is normally terminated.

* * * * *